(12) United States Patent
Yang

(10) Patent No.: US 11,048,623 B2
(45) Date of Patent: Jun. 29, 2021

(54) MEMORY CONTROLLER INCLUDING MAPPING TABLES TO EFFICIENTLY PROCESS AN ITERATION COMMAND AND A METHOD OF OPERATING THE SAME

(71) Applicant: SAMSUNG ELECTRONICS CO., LTD., Suwon-si (KR)

(72) Inventor: Seung-jun Yang, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 212 days.

(21) Appl. No.: 16/143,541

(22) Filed: Sep. 27, 2018

(65) Prior Publication Data

US 2019/0243903 A1    Aug. 8, 2019

(30) Foreign Application Priority Data

Feb. 6, 2018    (KR) .................. 10-2018-0014715

(51) Int. Cl.
    *G06F 12/02*    (2006.01)
    *G06F 16/22*    (2019.01)
(52) U.S. Cl.
    CPC ...... *G06F 12/0246* (2013.01); *G06F 16/2255* (2019.01); *G06F 2212/7201* (2013.01)
(58) Field of Classification Search
    None
    See application file for complete search history.

(56) References Cited

U.S. PATENT DOCUMENTS

| 6,681,230 B1* | 1/2004 | Blott .......................... G06F 8/38 |
| 7,509,473 B2* | 3/2009 | Horn ..................... G06F 3/0607 |
| | | 711/206 |
| 9,075,710 B2 | 7/2015 | Talagala et al. |
| 9,298,521 B1 | 3/2016 | Feldman et al. |
| 9,411,840 B2* | 8/2016 | Chen .................. G06F 16/2246 |
| 9,519,575 B2 | 12/2016 | Ramsundar et al. |
| 10,128,868 B1* | 11/2018 | Gopal ................. H03M 7/6011 |
| 2011/0145260 A1* | 6/2011 | Ichino ................ G06F 16/9014 |
| | | 707/747 |
| 2012/0331462 A1* | 12/2012 | Falko .................. G06F 9/45533 |
| | | 718/1 |
| 2016/0203135 A1 | 7/2016 | Bhattacharjee et al. |
| 2017/0032054 A1* | 2/2017 | Mistry ............... G06F 16/9024 |

FOREIGN PATENT DOCUMENTS

KR    10-2017-0028825    3/2017

\* cited by examiner

*Primary Examiner* — Christopher J Raab
(74) *Attorney, Agent, or Firm* — F. Chau & Associates, LLC

(57) ABSTRACT

A memory controller including: a memory configured to store first and second mapping tables; and a hashing module configured to receive a command including a first key from a host and retrieve a first physical address corresponding to the first key by using the first and second mapping tables, wherein the first mapping table is configured to store first region information about a first region corresponding to a partial region of the first key, the first region including at least one segment, and the second mapping table is configured to store a plurality of segments, wherein each segment includes a plurality of hash entries, the plurality of segments are grouped into a plurality of regions, and each of the plurality of hash entries stores a tag corresponding to a key and a physical address corresponding to the key,

16 Claims, 19 Drawing Sheets

MEMORY CONTROLLER INCLUDING MAPPING TABLES TO EFFICIENTLY PROCESS AN ITERATION COMMAND AND A METHOD OF OPERATING THE SAME

CROSS-REFERENCE TO RELATED APPLICATION

This application claims priority under 35 U.S.C. § 119 to Korean Patent Application No. 10-2018-001471.5, filed on Feb. 6, 2018, in the Korean Intellectual Property Office, the disclosure of which is incorporated by reference herein in its entirety.

TECHNICAL FIELD

The inventive concept relates to a storage device, and more particularly, to a memory controller and a method of operating the same.

DISCUSSION OF RELATED ART

Storage devices may include object-based storages and block-based storages depending on how they manage data. An object-based storage may be a storage structure configured to store and manage data in an object format. An object may be data with an arbitrary size, for example, multimedia data (e.g., a moving image) or a file. The object-based storage may be used to manage objects. An example of the object-based storage may be a key-value storage device.

SUMMARY

According to an exemplary embodiment of the inventive concept, there is provided a memory controller including a memory configured to store first and second mapping tables; and a hashing module configured to receive a command including a first key from a host and retrieve a first physical address corresponding to the first key by using the first and second mapping tables, wherein the first mapping table is configured to store first region information about a first region corresponding to a partial region of the first key, the first region including at least one segment, and the second mapping table is configured to store a plurality of segments, wherein each segment includes a plurality of hash entries, the plurality of segments are grouped into a plurality of regions, and each of the plurality of hash entries stores a tag corresponding to a key and a physical address corresponding to the key.

According to an exemplary embodiment of the inventive concept, there is provided a memory controller including a memory configured to store first and second mapping tables; and a hashing module configured to receive a command including a first key from a host and retrieve a first physical address corresponding to the first key by using the first and second mapping tables, wherein the first mapping table is configured to store first region information about a first region corresponding to a prefix of the first key, the first region having a variable size, the second mapping table is configured to store at least one segment corresponding to the first region, the at least one segment including a plurality of hash entries, and a size of the first region in the second mapping table varies based on prefixes of keys that are transmitted and received between the host and the memory controller.

According to an exemplary embodiment of the inventive concept, there is provided a method of operating a memory controller configured to communicate with a non-volatile memory. The method includes receiving a command including a key from a host; retrieving region information about a first region corresponding to a partial region of the key from a first mapping table based on the key; retrieving a first segment from the first region of a second mapping table based on the key and the region information; retrieving a first hash entry from the first segment of the second mapping table based on the key; and controlling a write operation or a read operation on the non-volatile memory based on a first physical address included in the first hash entry.

According to an exemplary embodiment of the inventive concept, there is provided a controller configured to: receive a command including a key from a host; retrieve region information about a first region corresponding to a partial region of the key from a first mapping table based on the key; retrieve a first segment from the first region of a second mapping table based on the key and the region information; retrieve a first hash entry from the first segment of the second mapping table based on the key; and control a write operation or a read operation on a non-volatile memory based on a first physical address included in the first hash entry.

BRIEF DESCRIPTION OF THE DRAWINGS

The above and other features of the inventive concept will be more clearly understood by describing in detail exemplary embodiments thereof with reference to the accompanying drawings in which.

DETAILED DESCRIPTION OF THE EMBODIMENTS

Figure 1:
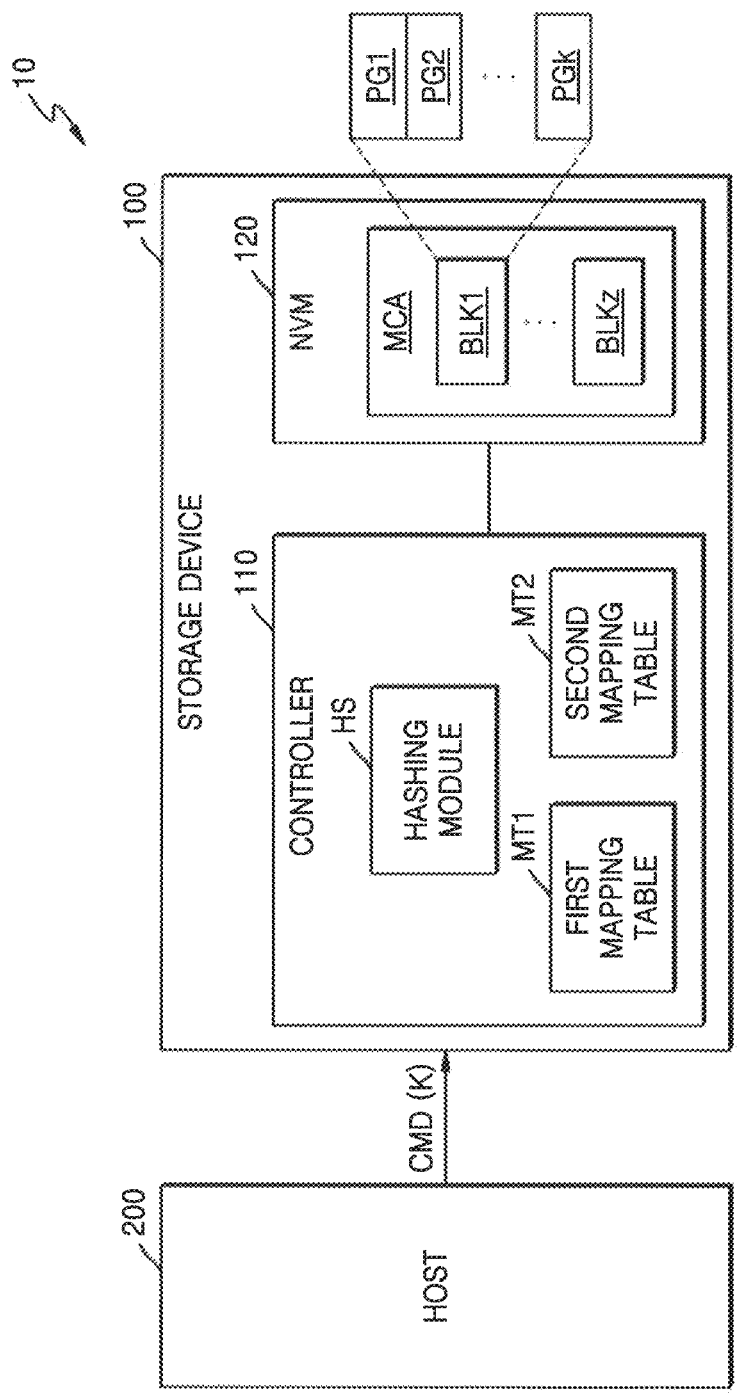
FIG. 1 is a block diagram of a storage system according to an exemplary embodiment of the inventive concept.

FIG. 1 is a block diagram of a storage system 10 according to an exemplary embodiment of the inventive concept.

Referring to FIG. 1, the storage system 10 may include a storage device 100 and a host 200, and the storage device 100 may include a memory controller 110 and a non-volatile memory (NVM) 120. The host 200 may communicate with the storage device 100 through various interfaces. For example, the host 200 may be an application processor (AP) or a System-On-a-Chip (SoC).

In an exemplary embodiment of the inventive concept, the storage device 100 may be a key-value storage device or a key-value store, for example, a key-value solid-state drive (SSD). The key-value storage device may be a device configured to process data rapidly using a key-value pair. The "key-value pair" may be a pair of a key K and a value, the key K may be unique, and the value may be data corresponding to the key K. The "key-value pair" may be a "tuple" or a "key-value tuple." In the key-value pair, the key K may be indicated by an arbitrary string, such as a file name, a uniform resource identifier (URI), or a hash, and the value may be an arbitrary type of data, such as an image or a user preference file or document. A size of each of the key K and the value may vary. For example, the size of the value may vary according to data included in the value.

Hereinafter, an exemplary embodiment of the inventive concept in which the storage device 100 is a key-value storage device will mainly be described, in other words, the storage device 100 described herein may be substantially synonymous with a key-value storage device or a key-value store. However, the storage device 100 is not limited thereto and may be used in an arbitrary object cache system or object storage system configured to manage data by units of objects. Accordingly, the storage device 100 may manage data by units of objects in an arbitrary manner other than the key-value pair.

In an exemplary embodiment of the inventive concept, the host 200 may transmit commands CMD including a key K and a value, for example, a write command or a put command, to the storage device 100, and the storage device 100 may write a value to the NVM 120 in response to the command CMD. In an exemplary embodiment of the inventive concept, the host 200 may transmit a command CMD including a key K, for example, a read command or a get command, to the storage device 100, and the storage device 100 may read a value corresponding to the key K from the NVM 120 in response to the command CMD. The host 200 may not convert the key K into a logical block address (LBA) unit having a fixed size, instead, the host 200 may generate a command CMD including a key K having a variable size and transmit the generated command CMD to the storage device 100.

In an exemplary embodiment of the inventive concept, the host 200 may transmit a command CMD corresponding to a predetermined range of keys to the storage device 100. This command CMD may be an iteration command or a range query. For instance, the host 200 may transmit an iteration command corresponding to a predetermined range of keys including the same prefix to the storage device 100, and the storage device 100 may read values corresponding to the predetermined range of keys from the NVM 120 in response to the iteration command.

Figures 2, 3A:
FIG. 2 shows a key according to an exemplary embodiment of the inventive concept.
FIG. 3A shows a first mapping table according to an exemplary embodiment of the inventive concept.

FIG. 2 shows a key K according to an exemplary embodiment of the inventive concept.

Referring to FIG. 2, the key K may include a prefix PFX and a suffix SFX. The prefix PFX may have a fixed size, and the suffix SFX may have a variable size. For example, when the key K is 16 bytes, the prefix PFX may be 2 bytes, and the suffix SFX may be 14 bytes. In an exemplary embodiment of the inventive concept, prefixes of first and second keys may be the same, while suffixes of the first and second keys may be different. For instance, the prefix of the first key may be "apple", and the suffix of the first key may be "juice." The prefix of the second key may be "apple", and the suffix of the second key may be "pie."

In an exemplary embodiment of the inventive concept, an iteration command may be a get command corresponding to a plurality of keys including the same prefix. For example, the host 200 may transmit a get command corresponding to first to N-th keys, each of which has a prefix of "apple." When the storage device 100 stores only a hash table configured to store a physical address corresponding to a key, the storage device 100 may retrieve first to N-th physical addresses respectively corresponding to the first to N-th keys from the hash table. For example, the storage device 100 may obtain a valid physical address corresponding to each of the first to N-th keys with reference to all hash entries included in the hash table, read a full key stored in the obtained physical address, and check if the full key falls within a range of the keys included in the iteration command. Accordingly, in the case of the iteration command, the time taken to retrieve the hash table may be increased by N times in comparison with a normal command.

Referring to FIGS. 1 and 2, the memory controller 110 may include first and second mapping tables MT1 and MT2 and a hashing module HS. Hereinafter, the memory controller 110 may be referred to as a controller for brevity. For example, the first and second mapping tables MT1 and MT2 may be loaded into a memory (e.g., a memory 112 in FIG. 7) included in the controller 110. FIG. 1 illustrates a case in which the first and second mapping tables MT1 and MT2 are included in the controller 110, but the inventive concept is not limited thereto. In an exemplary embodiment of the inventive concept, the first and second mapping tables MT1 and MT2 may be loaded into a memory chip (e.g., a dynamic random access memory (DRAM) chip) located outside a controller chip including the controller 110. The first mapping table MT1 may store region information about a region assigned to each prefix PFX, the second mapping table MT2 may store at least one segment corresponding to each region, and each segment may include a plurality of hash entries. The first and second mapping tables MT1 and MT2 will be described in further detail with reference to FIGS. 3A and 3B.

The hashing module HS may perform a hash operation based on the key K and generate a hash index corresponding to the key K. In an exemplary embodiment of the inventive concept, the hashing module HS may perform a first hash operation on the suffix SFX of the key K and region information of the key K to retrieve a segment. In addition, the hashing module HS may perform a second hash operation on the suffix SFX of the key K to retrieve a hash entry. For example, the first hash operation may be a consistent hash operation. For example, the second hash operation may be a hopscotch hash operation.

The NVM 120 may include a memory cell array MCA, which may include memory blocks BLK1 to BLKz. The memory block BLK1 may include a plurality of pages PG1 to PGk. Here, each of z and k may be a positive integer and may be variously changed according to an exemplary embodiment of the inventive concept. For example, a memory block BLK may be a unit of an erase operation, while a page PG may be a unit of write and read operations. In exemplary embodiments of the inventive concept, the memory cell array MCA may include a plurality of planes, a plurality of dies, or a plurality of chips. In an exemplary embodiment of the inventive concept, the NVM 120 may include a flash memory device, for example, a NAND flash memory device. However, the inventive concept is not limited thereto, and the NVM 120 may include a resistive memory device, such as a resistive RAM (ReRAM), a phase-change RAM (PRAM), and a magnetic RAM (MRAM).

The storage system 10 may be, for example, a personal computer (PC), a data server, a network-coupled storage, an Internet of Things (IoT) device, or a portable electronic device. The portable electronic device may be a laptop computer, a mobile phone, a smartphone, a tablet PC, a personal digital assistant (PDA.), an enterprise digital assistant (EDA), a digital still camera, a digital video camera, an audio device, a portable multimedia player (PMP), a personal navigation device (PND), an MPEG-1 audio layer 3 (MP3) player, a handheld game console, an electronic book (e-hook), or a wearable device.

In exemplary embodiments of the inventive concept, the storage device 100 may be an internal memory embedded in an electronic device. For example, the storage device 100 may be a solid-state drive (SSD), an embedded universal flash storage (UFS) memory device, or an embedded multimedia card (eMMC). In exemplary embodiments of the inventive concept, the storage device 100 may be an external memory that is detachably attached to an electronic device. For instance, the storage device 100 may be a UFS memory card, a compact flash (CF) card, a secure digital (SD) card, a micro-secure digital (micro-SD) card, a mini-SD card, an extreme digital (xD) card, or a memory stick.

FIG. 3A shows a first mapping table MT1 according to an exemplary embodiment of the inventive concept.

Referring to FIG. 3A, the first mapping table MT1 may store region information about a plurality of regions respectively corresponding to a plurality of prefixes. Therefore, keys having different prefixes may be assigned to different regions. For example, a first prefix PFX1 may be assigned to a first region RG1, a second prefix PFX2 may be assigned to a second region RG2, and a third prefix PFX3 may be assigned to a third region RG3. For example, the first prefix PFX1 may be "apple," the second prefix PFX2 may be "peach," and the third prefix PFX3 may be "grape."

Figure 3B:
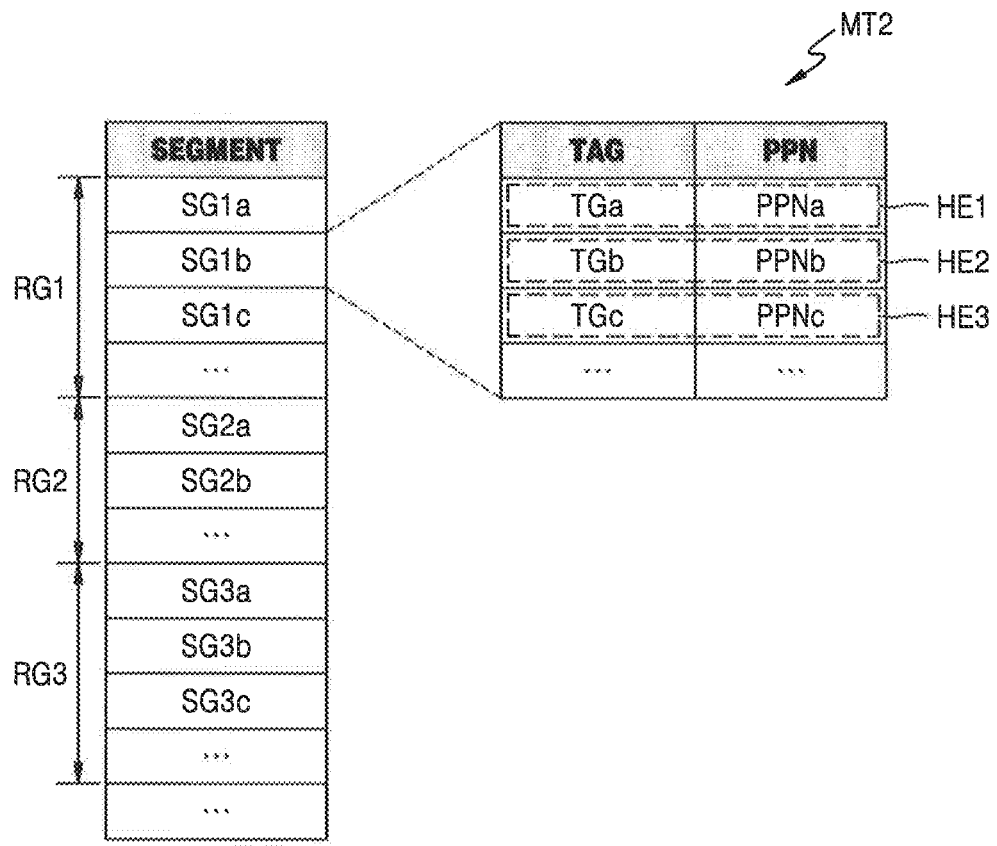
FIG. 3B shows a second mapping table according to an exemplary embodiment of the inventive concept.

FIG. 3B shows a second mapping table MT2 according to an exemplary embodiment of the inventive concept.

Referring to FIG. 3B, the second mapping table MT2 may include a plurality of segments, and the plurality of segments may be grouped into a plurality of regions. For example, segments SG1a, SG1b and SG1c may be grouped into a first region RG1, segments SG2a and SG2b may be grouped into a second region RG2, and segments SG3a, SG3b and SG3c may be grouped into a third region RG3. In addition, each of the segments may include a plurality of hash entries HE1, HE2 and HE3. In an exemplary embodiment of the inventive concept, each of the hash entries HE1 to HE3 may store a tag corresponding to a portion of a key and a physical address PPN corresponding to the tag. For example, a first hash entry HE1 may store a first tag TGa and a first physical address PPNa, a second hash entry HE2 may store a second tag TGb and a second physical address PPNb, and a third hash entry HE3 may store a third tag TGc and a third physical address PPNc.

Figure 4:
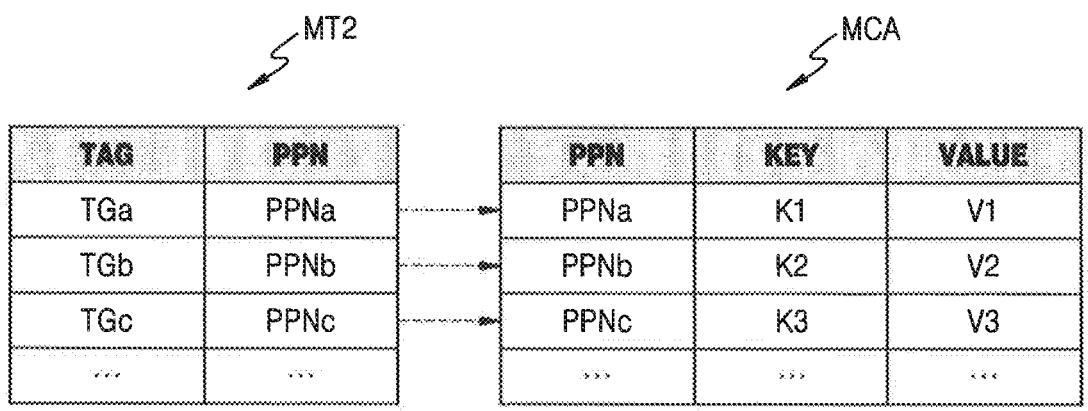
FIG. 4 shows a second mapping table and a memory cell array of a non-volatile memory according to an exemplary embodiment of the inventive concept.

FIG. 4 shows a second mapping table MT2 and a memory cell array MCA of an NVM, according to an exemplary embodiment of the inventive concept.

Referring to FIG. 4, the memory cell array MCA may include first, second and third physical addresses PPNa, PPNb, and PPNc. The first physical address PPNa may store a first key K1 and a first value V1, the second physical address PPNb may store a second key K2 and a second value V2, and a third physical address PPNc may store a third key K3 and a third value V3. In this case, each of the first to third keys K1, K2, and K3 stored in the memory cell array MCA may correspond to a full key. Additionally, first, second and third tags TGa, TGb, and TGc stored in the second mapping table MT2 may correspond to portions of the first to third keys K1, K2, and K3, respectively.

Referring to FIGS. 1 to 4, when the storage device 100 receives an iteration command for a plurality of keys having a first prefix PFX1, the storage device 100 may not retrieve the entire range of the second mapping table MT2 (e.g., all hash entries included in the second mapping table MT2). Instead, the storage device 100 retrieves hash entries respectively corresponding to the plurality of keys from segments SG1a to SG1c included in a partial range (e.g., a first region RG1) of the second mapping table MT2. For example, when the storage device 100 receives an iteration command corresponding to the first to N-th keys and the first to N-th keys include the first prefix PFX1, the storage device 100 may retrieve only the hash entries included in the first region RG1 and check if keys stored in the retrieved hash entries correspond to the first to N-th keys. Accordingly, the storage device 100 may effectively and efficiently process the iteration command using hash-based mapping.

Figure 5:
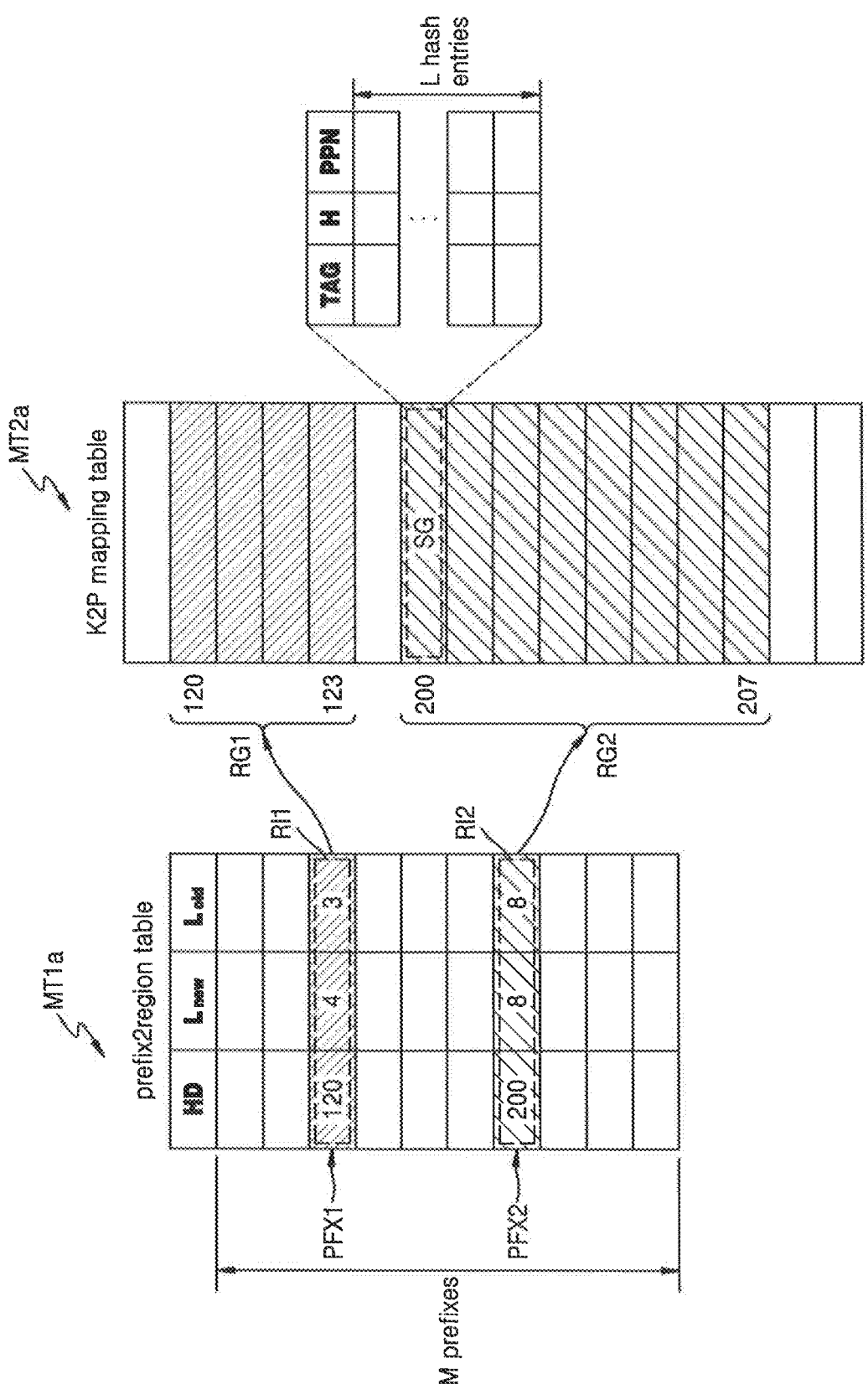
FIG. 5 shows first and second mapping tables according to an exemplary embodiment of the inventive concept.

FIG. 5 shows first and second mapping tables MT1a and MT2a according to an exemplary embodiment of the inventive concept.

Referring to FIGS. 1 and 5, the first mapping table MT1a may store M pieces of region information corresponding to prefixes, and M may be an integer. Thus, the first mapping table MT1a may be a prefix-2-region (prefix2region) table. In an exemplary embodiment of the inventive concept, region information may include a head HD indicating a head location (e.g., a head index) of each region and a length indicating a size of each region. Here, the head HD may be an index corresponding to a head segment included in each region.

In an exemplary embodiment of the inventive concept, a size of a region corresponding to a prefix may be changed. For example, in a runtime, when a percentage taken by keys including a first prefix PFX1 of keys that are transmitted and received between the host 200 and the storage device 100 increases, a size of the first region RG1 corresponding to the first prefix PFX1 may increase. Thus, in an exemplary embodiment of the inventive concept, a length of the first region RG1 may include a first length $L_{old}$ indicating an old size of each region and a second length $L_{new}$ indicating a changed size of each region.

For example, according to first region information RI1 corresponding to the first prefix PFX1, a head HD of the first region RG1 may be "120," a first length $L_{old}$ of the first region RG1 may be "3," and a second length $L_{new}$ of the first region RG1 may be "4." When the percentage of the keys that are transmitted and received between the host 200 and the storage device 100 and that include the first prefix PFX1 increases, the size of the first region RG1 may increase, and thus, the second length $L_{new}$ may be greater than the first length $L_{old}$.

For example, according to second region information RI2 corresponding to a second prefix PFX2, a head HD of the second region RG2 may be "200," a first length $L_{old}$ of the second region RG2 may be 8, a second length $L_{new}$ of the second region RG2 may also be 8. When a percentage of the keys that are transmitted and received between the host 200 and the storage device 100 and that include the second prefix PFX2 is constant or changed within a critical range, a size of the second region RG2 may not be changed, and thus, the first length $L_{old}$ may be equal to the second length $L_{new}$.

However, the inventive concept is not limited thereto. For example, region information may include a head segment $segment_{head}$ of each region and a tail segment $segment_{tail}$ of each region. For example, the region information may be expressed as shown in Equation (1):

$$\text{prefix2region[prefix]}=(segment_{head}, segment_{tail}) \quad (1).$$

In addition, the second mapping table MT2a may store a plurality of segments SG, each of which may include a plurality of hash entries, and each of the hash entries may store a physical address corresponding to a key. Thus, the second mapping table MT2a may be a key-2-PPN (K2P) mapping table. A head index of the first region RG1 may be "120," a tail index of the first region RG1 may be "123," and the first region RG1 may include four segments. A head index of the second region RG2 may be "200," a tail index of the second region RG2 may be "207," and the second region RG2 may include eight segments.

Each of the segments SG may include L hash entries, where L may be an integer. For example, L may be 256. Each of the hash entries may include a tag TAG corresponding to a portion of a key and a physical address PPN for storing a value corresponding to the key in the NVM 120. For example, when a hopscotch hash operation is used, each of the hash entries may further include a bitmap H. Here, the bitmap H may indicate a storage location of at least one hash entry corresponding to a hash index. For example, when a collision limit is determined as 4, the bitmap H may be 4 bits. For example, a location in which a hash entry corresponding to a hash index is stored may be set to '1,' while a location in which a hash entry corresponding to a hash index is not stored may be set to '0.'

As described above, according to the present embodiment, when the storage device 100 receives an iteration command for keys including the second prefix PFX2, the storage device 100 may retrieve hash entries included in segments included in the second region RG2 and obtain physical addresses corresponding to the keys. For example, when L is 256, the storage device 100 may retrieve 2048 (=8*256) hash entries and obtain physical addresses. However, unlike in the present embodiment, when the first mapping table MT1a is not included, a region corresponding to the second prefix PFX2 may not be defined. Thus, since the storage device 100 needs to retrieve all hash entries included in the second mapping table MT2a, an amount of operations involved in the retrieval process may be very large, and a retrieval time may be very long.

For example, according to the present embodiment, a region to be scanned in the second mapping table MT2a may be reduced by an inverse proportion to the number of predefined prefixes. For example, when the number of predefined prefixes is M, the region to be scanned in the second mapping table MT2a may be reduced to 1/M. In addition, when a write operation is performed, since mapping information about the corresponding key is stored in a region assigned to a prefix of the corresponding key in the second mapping table MT2a, all full keys indicated by hash entries included in the same region of the second mapping table MT2a may have the same prefix. Accordingly, an amount of operations required to read all key-value pairs included in the same region of the second mapping table MT2a may be equal to a minimum value of operation required to process an iteration command.

Figure 6:
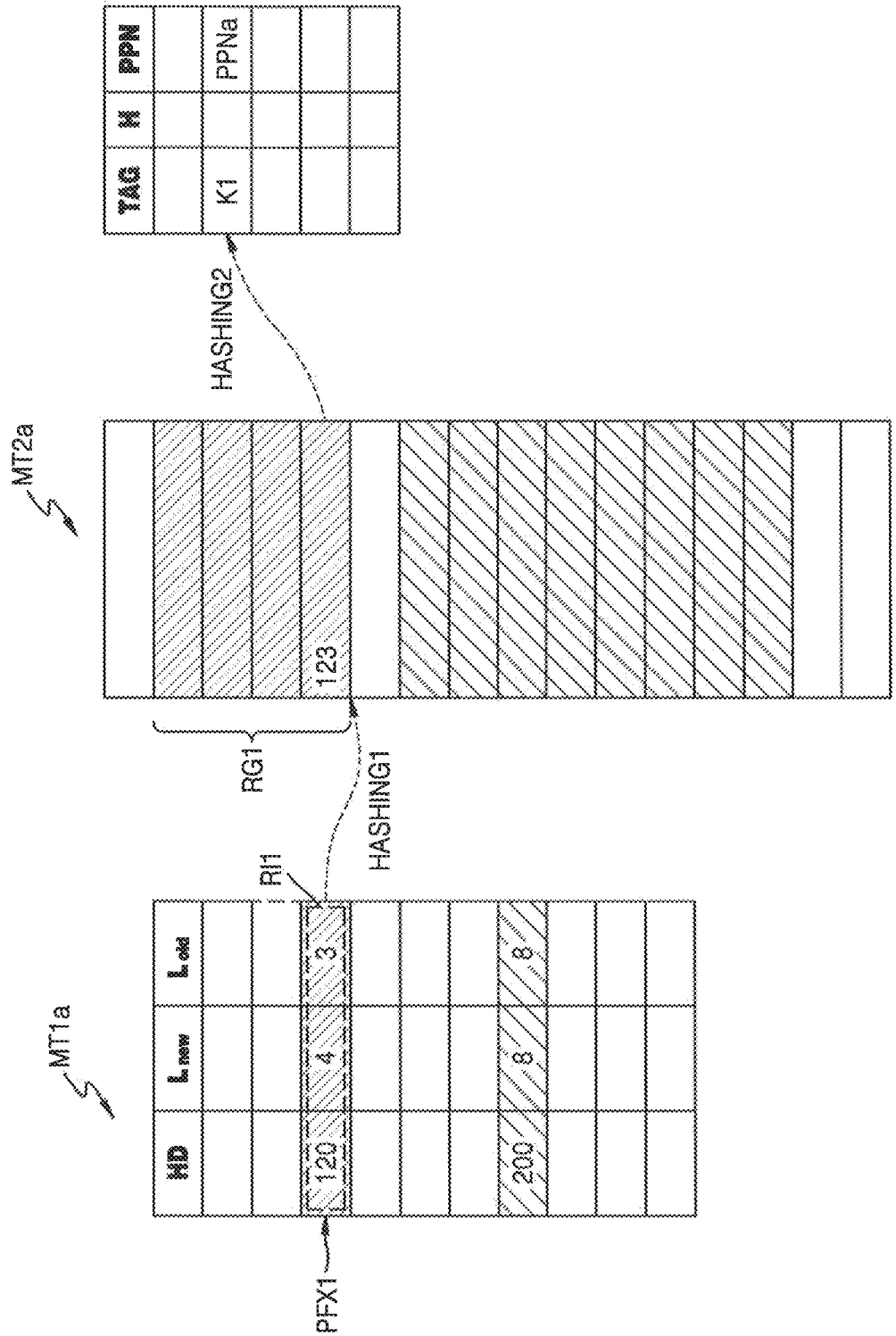
FIG. 6 shows an operation of retrieving a physical address from the first and second mapping tables of FIG. 5 according to an exemplary embodiment of the inventive concept.

FIG. 6 shows an operation of retrieving a physical address from the first and second mapping tables MT1a and MT2a of FIG. 5, according to an exemplary embodiment of the inventive concept.

Referring to FIGS. 1 and 6, the controller 110 may retrieve first region information RI1 corresponding to a prefix PFX1 from the first mapping table MT1a based on the prefix PFX1 of a key K included in a command CMD provided, for example, from the host 200. For example, a region corresponding to the prefix PFX1 of the key K may be a first region RG1. The hashing module HS of the controller 110 may perform a first hash operation HASHING1 on a suffix of the key K and region information and retrieve a segment from the first region RG1 of the second mapping table MT2a. For example, an index of the retrieved segment may be "123."

Subsequently, the hashing module HS may perform a second hash operation HASHING2 on the suffix of the key K and retrieve a hash entry from among a plurality of hash entries included in the retrieved segment. For example, a physical address included in the retrieved hash entry may be PPNa. As described above, according to an exemplary embodiment of the inventive concept, the hashing module HS may sequentially perform the first hash operation HASHING1 and the second hash operation HASHING2 to obtain the physical address.

Figure 7:
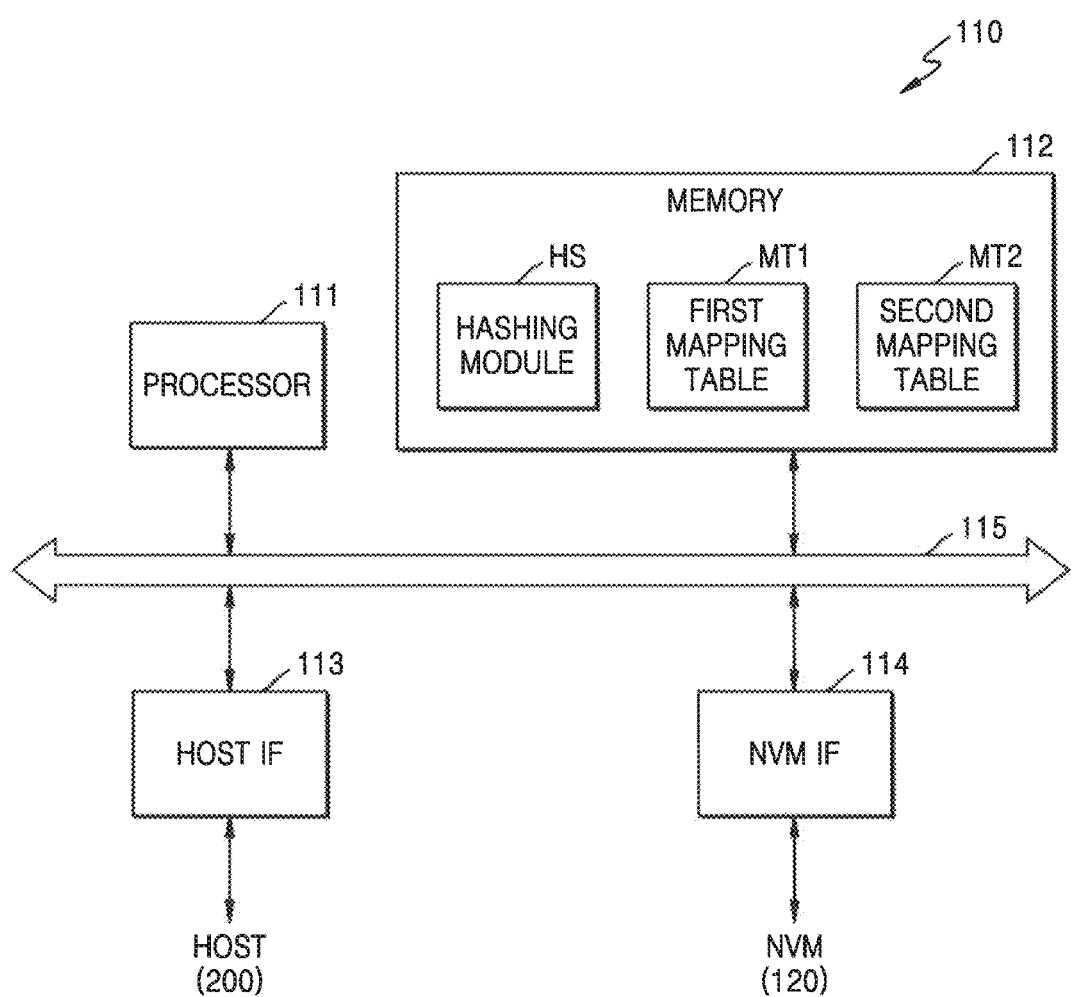
FIG. 7 shows a controller of FIG. 1, according to an exemplary embodiment of the inventive concept.

FIG. 7 shows the controller 110 of FIG. 1, according to an exemplary embodiment of the inventive concept.

Referring to FIGS. 1 and 7, the controller 110 may include a processor 111, a memory 112, a host interface 113, and an NVM interface 114, which may communicate with one another through a bus 115. The processor 1 1 1 may include a central processing unit (CPU) or a microprocessor (MP) and control the overall operation of the controller 110. In an exemplary embodiment of the inventive concept, the processor 111 may be a multi-core processor. For example, the processor 111 may be a dual-core processor or a quad-core processor.

The memory 112 may operate via the control of the processor 111 and be used as an operation memory, a buffer memory, or a cache memory. For example, the memory 112 may be a volatile memory, such as dynamic random access memory (DRAM) or static random access memory (SRAM), or an NVM, such as PRAM or a flash memory. In an exemplary embodiment of the inventive concept, first and second mapping tables MT1 and MT2 and a hashing module HS may be loaded into the memory 112. The hashing module HS may be firmware or software and loaded into the memory 112. In an exemplary embodiment of the inventive concept, the hashing module HS may be a flash translation layer (FTL). However, the inventive concept is not limited thereto, and the hashing module HS may be hardware.

The host interface 113 may provide an interface between the host 200 and the controller 110. The host interface 113 may provide an interface according to a universal serial bus (USB), a multimedia card (MMC), a peripheral component interconnect-express (PCI-E), an advanced technology attachment (ATA), a serial ATA (SATA), a parallel-ATA (PATA), a small computer system interface (SCSI), a serial attached SCSI (SAS), an enhanced small device interface (ESDI), and an intelligent drive electronics (IDE).

The NVM interface 114 may provide an interface between the controller 110 and the NVM 120. For example, the first and second mapping tables MT1 and MT2, keys, and values may be transmitted and received between the controller 110 and the NVM 120 through the NVM interface 114. In an exemplary embodiment of the inventive concept, the number of NVM interfaces 114 may correspond to the number of NVM chips included in the storage device 100 or the number channels between the controller 110 and the NVM 120.

Figure 8:
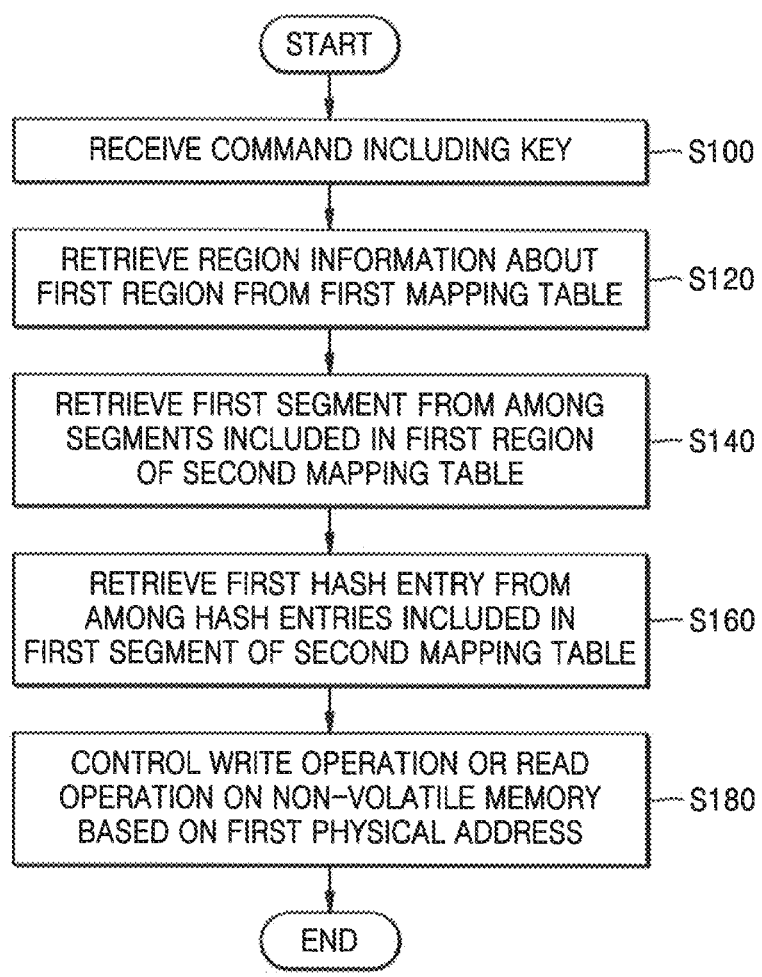
FIG. 8 is a flowchart of a method of operating a memory controller, according to an exemplary embodiment of the inventive concept.

FIG. 8 is a flowchart of a method of operating a memory controller, according to an exemplary embodiment of the inventive concept.

Referring to FIG. 8, the method of operating the memory controller according to an exemplary embodiment of the inventive concept may include, for example, operations performed by the controller 110 of FIG. 1 in a temporal sequence. Accordingly, the above descriptions presented with reference to FIGS. 1 to 7 may be applied to the present embodiment, and repeated descriptions will be omitted.

In operation S100, the controller 110 may receive a command CMD including a key K. In an exemplary embodiment of the inventive concept, the command CMD may be a put command including a key K and a value. In an exemplary embodiment of the inventive concept, the command CMD may be a get command including a key K. In an exemplary embodiment of the inventive concept, the command CMD may be an erase command including a key K. In an exemplary embodiment of the inventive concept, the command CMD may be a prefix-based iteration command. For example, the host interface 113 of the controller 110 may include a command decoder, which may decode the command CMD and distinguish a type of the command CMD received from the host 200.

In operation S120, the controller 110 may retrieve region information about a first region RG1 from a first mapping table MT1. For example, the controller 110 may retrieve region information about the first region RG1 corresponding to a prefix included in the key K, from region information stored in the first mapping table MT1. For example, the processor 111 of the controller 110 may access the memory 112 and retrieve the region information about the first region RG1 from the first mapping table MT1. For example, the region information may include a head HD indicating a head index of the first region. RG1 and a second length $L_{new}$ indicating a changed size of the first region RG1. In an exemplary embodiment of the inventive concept, when the command CMD is an iteration command, region information corresponding to keys including the same prefix may be the same.

In operation S140, the controller 110 may retrieve a first segment from among segments included in a first region of the second mapping table MT2. For example, the hashing module HS may perform a first hash operation HASHING1 on a suffix included in the key K and a second length $L_{new}$ included in the region information and retrieve the first segment. For example, an index of the first segment may be "123." In an exemplary embodiment of the inventive concept, when the command CMD is an iteration command, segments corresponding to keys including respectively different suffixes may be respectively different.

In operation S160, the controller 110 may retrieve a first hash entry from among hash entries included in the first segment of the second mapping table MT2. For example, the hashing module HS may perform a second hash operation HASHING2 on the suffix included in the key K and retrieve the first hash entry. For example, the first hash entry may store a tag corresponding to a portion of the key K and a first physical address corresponding to the key K. In an exemplary embodiment of the inventive concept, when the command CMD is an iteration command, hash entries corresponding to keys including respectively different suffixes may be respectively different. Thus, physical addresses corresponding to the keys may be different from each other.

In operation S180, the controller 110 may control a write operation or a read operation on the NVM 120 based on the first physical address. In an exemplary embodiment of the inventive concept, when the command CMD is a put command, the controller 110 may control an operation of writing a key K and a value corresponding to the key K to the first physical address of the NVM 120. In an exemplary embodiment of the inventive concept, when the command CMD is a get command, the controller 110 may control a read operation of a value corresponding to the key K from the first physical address of the NVM 120. In an exemplary embodiment of the inventive concept, when the command CMD is an iteration command, the controller 110 may control an operation of reading values corresponding to keys from different physical addresses of the NVM 120.

Figure 9:
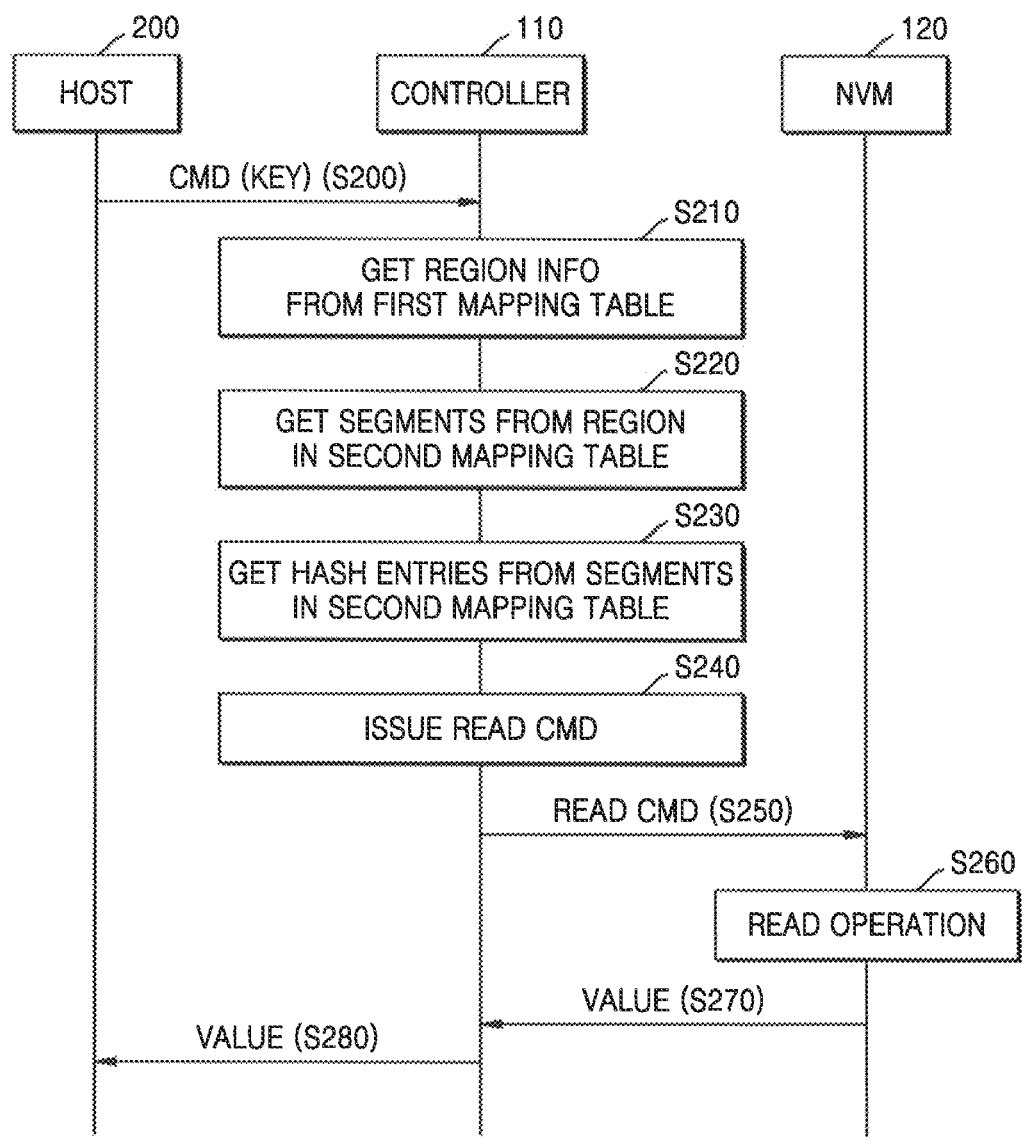
FIG. 9 is a flowchart of a read operation between a host, a controller, and a non-volatile memory, according to an exemplary embodiment of the inventive concept.
Figure 10:
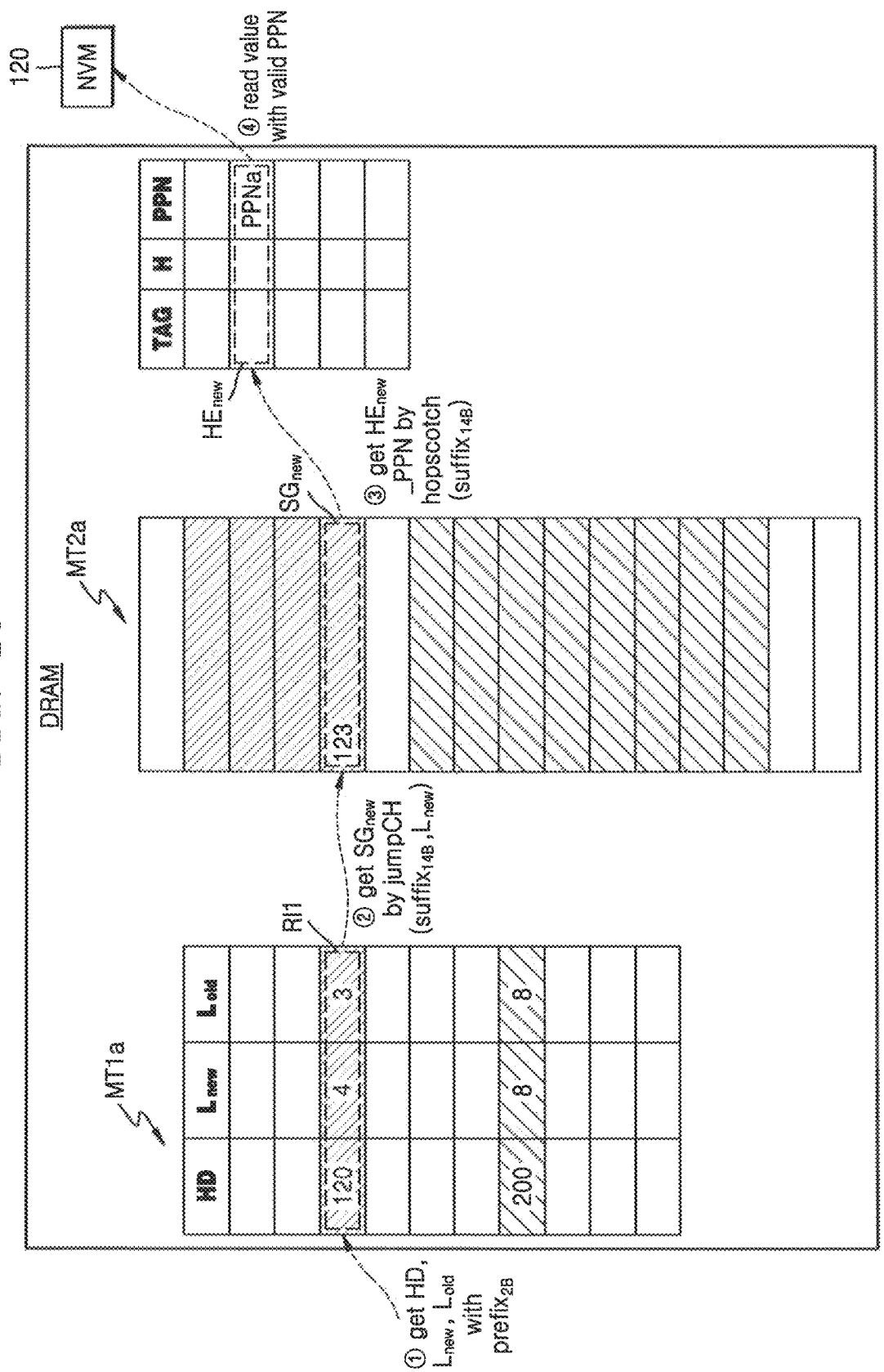
FIG. 10 shows the read operation of FIG. 9, according to an exemplary embodiment of the inventive concept.

FIG. 9 is a flowchart of a read operation between the host. 200, the controller 110, and the NVM 120, according to an exemplary embodiment of the inventive concept. FIG. 10 shows a read operation of FIG. 9, according to an exemplary embodiment of the inventive concept.

The read operation according to the present embodiment may correspond to the method of FIG. 8 and will now be described with reference to FIGS. 1, 9, and 10. First and second mapping tables MT1a and MT2a may be loaded into a DRAM. For example, a key may be 16 bytes, a prefix may be 2 bytes, and a suffix may be 14 bytes.

In operation S200, the host 200 may transmit a command CMD to the controller 110. For example, the command CMD may be an iteration command. Hereinafter, an embodiment in which the command CMD is an iteration command will mainly be described. All keys included in the iteration command may have the same prefix. In operation S210, the controller 110 may obtain region information from the first mapping table MT1a based on prefixes of keys. For example, the controller 110 may retrieve a region corresponding to the key from the first mapping table MT1a using a prefix $prefix_{2B}$ of the key, and obtain region information (e.g., a head HD and first and second lengths $L_{old}$ and $L_{new}$) corresponding to the retrieved region. In FIG. 10, operation S210 is shown by (1) "get HD, $L_{new}$, $L_{old}$ with $Prefix_{2B}$".

In operation S220, the controller 110 may obtain segments from a region of the second mapping table MT2a based on suffixes of the keys. For example, the controller 110 may perform a first hash operation, for example, a jump consistence hash operation $jumpCH(suffix_{14B}, L_{new})$ on a suffix $suffix_{14B}$ of the key and a second length $L_{new}$ and obtain a new segment $SG_{new}$ of the second mapping table MT2a. The jump consistence hash operation jumpCH (suffix$_{14B}$, L$_{new}$) will be described below with reference to FIGS. 16A to 16C. In an exemplary embodiment of the inventive concept, when the command CMD is a normal command, the controller 110 may obtain one segment from one region of the second mapping table MT2a based on the suffix suffix$_{14B}$ of the key and the second length L$_{new}$. In FIG. 10, operation S220 is shown by (2) "get SG$_{new}$ by jumpCH(suffix$_{14B}$, L$_{new}$)".

In operation S230, the controller 110 may obtain hash entries from segments of the second mapping table MT2a based on the suffixes of the keys. In this case, the hash entries may each include physical addresses. For example, the controller 110 may perform a second hash operation, for example, a hopscotch hash operation hopscotch(suffix$_{14B}$) on the suffix suffix$_{14B}$ of the key, retrieve a new hash entry HE$_{new}$, and obtain a new physical address HE$_{new}$_PPN from the new hash entry HE$_{new}$. In an exemplary embodiment of the inventive concept, when the command CMD is a normal command, the controller 110 may obtain one hash entry from one segment of the second mapping table MT2a based on the suffix suffix$_{14B}$ of the key. In FIG. 10, operation S230 is shown by (3) "get HE$_{new}$_PPN by hopscotch (suffix$_{14B}$)".

In operation S240, the controller 110 may issue a read command based on the physical addresses. For example, the controller 110 may determine if the new physical address HE$_{new}$_PPN is valid. If the new physical address HE$_{new}$_PPN is valid, the controller 110 may issue the read command to read a value from the NVM 120 using the valid physical address. If the new physical address HE$_{new}$_PPN is not valid, operations according to exemplary embodiments of the inventive concept to be described with reference to FIGS. 11 and 12 may be performed. In FIG. 10, operation S240 is shown by (4) "read value with valid PPN".

In operation S250, the controller 110 may transmit a read command to the NVM 120. In this case, the read command may include the new physical address HE$_{new}$_PPN. In operation S260, the NVM 120 may perform a read operation on the memory cell array MCA and read a value. In operation S270, the NVM 120 may transmit the read value to the controller 110. In operation S280, the controller 110 may transmit the read value to the host 200.

Figure 11:
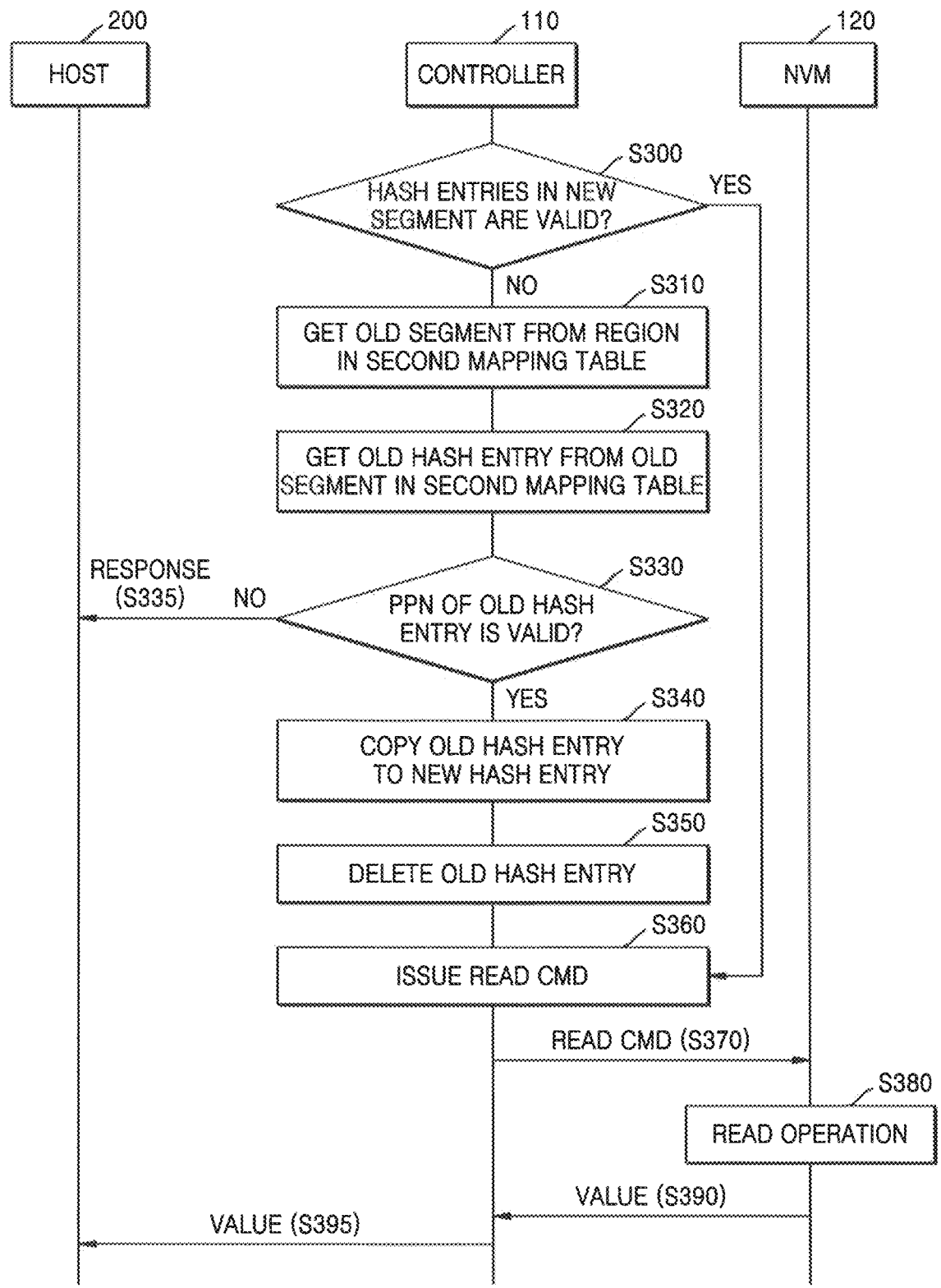
FIG. 11 is a flowchart of a read operation between a host, a controller, and a non-volatile memory, according to an exemplary embodiment of the inventive concept.
Figure 12:
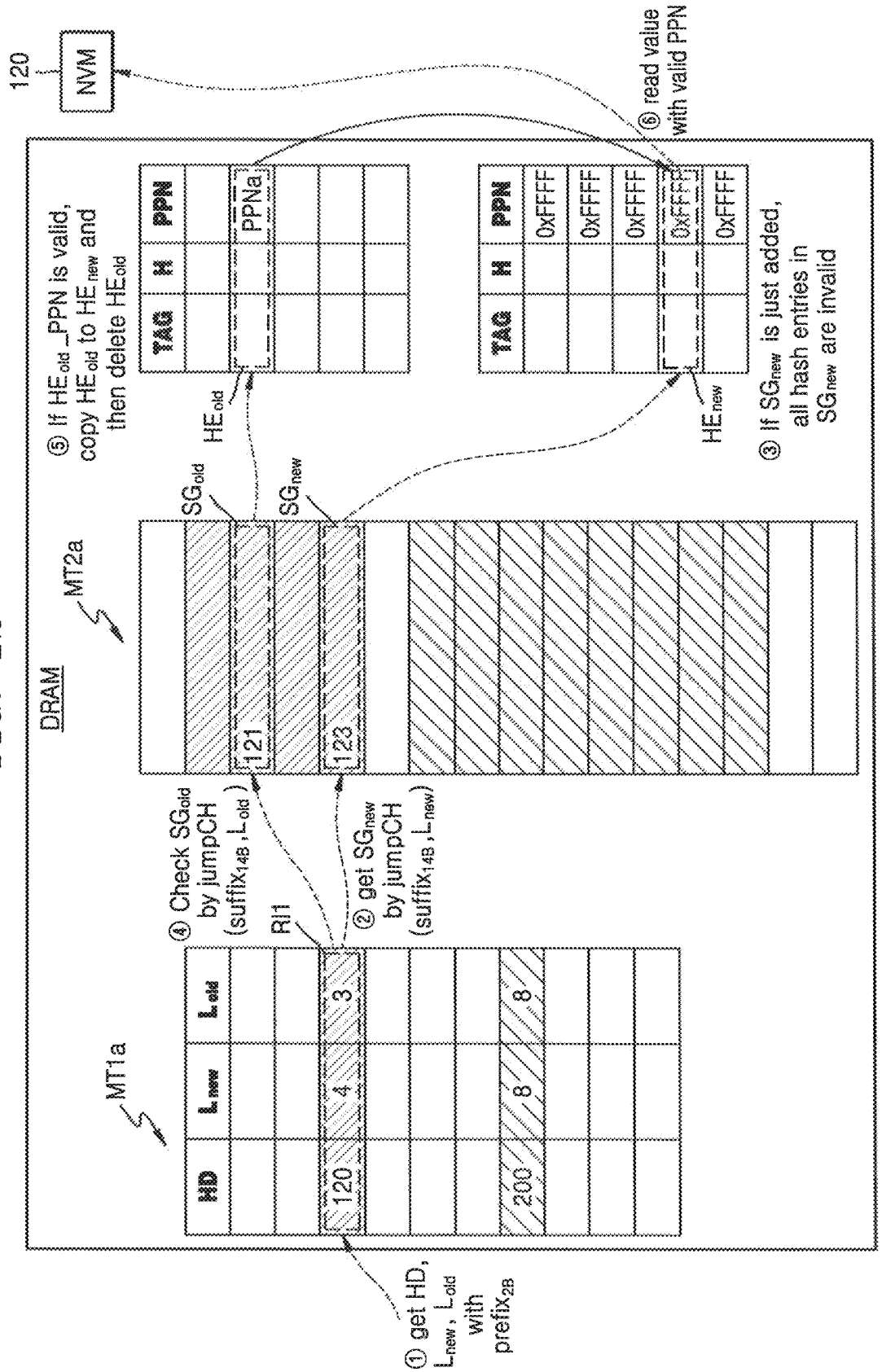
FIG. 12 shows the read operation of FIG. 11, according to an exemplary embodiment of the inventive concept.

FIG. 11 is a flowchart of a read operation between the host 200, the controller 110, and the NVM 120, according to an exemplary embodiment of the inventive concept. FIG. 12 shows the read operation of FIG. 11, according to an exemplary embodiment of the inventive concept.

The read operation according to the present embodiment may correspond to the method of FIG. 8 and will now be described with reference to FIGS. 1, 11, and 12. For example, the read operation according to the present embodiment may be performed after operation S230 of FIG. 9 or operation (3) of FIG. 10. Thus, the above descriptions presented with reference to FIGS. 9 and 10 may be applied to the present embodiment.

In a first mapping table MT1a, when a region corresponding to a prefix prefix$_{2B}$ of a key is a first region RG1, region information about the first region RG1 may be obtained. In this case, a size of the first region RG1 may be increased from 3 to 4, and the region information corresponding to the first region RG1 may include a head HD, a first length L$_{old}$, and a second length L$_{new}$ of the first region RG1. Subsequently, a first hash operation may be performed on a suffix suffix$_{14B}$ of the key and the second length L$_{new}$ to obtain a new segment SG$_{new}$. For example, as a result of the first hash operation, an index of the new segment SG$_{new}$ may be "123." When the new segment SG$_{new}$ is just added, all hash entries of the new segment SG$_{new}$ may not be valid (see e.g., (3) in FIG. 12). In other words, all physical addresses stored in the hash entries may be invalid addresses. The following operations S300 to S395 may correspond to the read operation between the host 200, the controller 110, and the NVM 120 when all of the hash entries of the new segment SG$_{new}$ are invalid. In other words, the operations S300 to S395 may be performed when it is determined in operation S240 of FIG. 9 that the new physical address HE$_{new}$_PPN is invalid.

In operation S300, the controller 110 may determine if hash entries included in the new segment SG$_{new}$ are valid. If the hash entries are determined as not valid, operation S310 may be performed. Otherwise, if the hash entries are determined as valid, operation S360 may be performed. Operations S360 to S395 may correspond to operations S240 to S280. In operation S310, the controller 110 may obtain an old segment from the second mapping table MT2a based on the suffix of the key. For example, the controller 110 may perform a first hash operation, fir example, a jump consistence hash operation jumpCH(suffix$_{14B}$, L$_{old}$) on the suffix suffix$_{14B}$ of the key and the first length L$_{old}$, and obtain the old segment SG$_{old}$ of the second mapping table MT2a. In FIG. 12, operation S310 is shown by (4) "Check SG$_{old}$ jumpCH(suffix$_{14B}$, L$_{old}$)". An index of the old segment SG$_{old}$ may be "121."

In operation S320, the controller 110 may obtain an old hash entry HE$_{old}$ from the old segment SG$_{old}$ of the second mapping table MT2a based on the suffix of the key. For example, the controller 110 may perform a second hash operation, for example, a hopscotch hash operation hopscotch(suffix$_{14B}$) on the suffix suffix$_{14}$ of the key, retrieve the old hash entry HE$_{old}$ from the old segment SG$_{old}$, and obtain the old physical address HE$_{old}$_PPN from the old hash entry HE$_{old}$.

In operation S330, the controller 110 may determine if the physical address HE$_{old}$_PPN of the old hash entry HE$_{old}$ is valid. If the physical address HE$_{old}$_PPN of the old hash entry HE$_{old}$ is determined as valid, operation S340 may be performed. Otherwise, if the physical address HE$_{old}$_PPN of the old hash entry HE$_{old}$ is determined as not valid, the controller 110 may transmit an error response to the host 200 in operation S335.

In operation S340, the controller 110 may copy the old hash entry HE$_{old}$ to a new hash entry HE$_{new}$. In operation S350, the controller 110 may delete the old hash entry HE$_{old}$. In FIG. 12, operations S340 and S350 are shown by (5) "If HE$_{old}$_PPN is valid, copy HE$_{old}$ to HE$_{new}$ and then delete HE$_{old}$". In operation S360, the controller 110 may issue a read command. In an exemplary embodiment of the inventive concept, operation S350 may be performed after operation S360 or after operation S390.

In operation S370, the controller 110 may transmit a read command to the NVM 120. In operation S380, the NVM 120 may perform a read operation and read a value. In FIG. 12, operation 8380 is shown by (6) "read value with valid PPN". In operation S390, the NVM 120 may transmit the read value to the controller 110. In operation S395, the controller 110 may transmit the value to the host 200.

Figure 13:
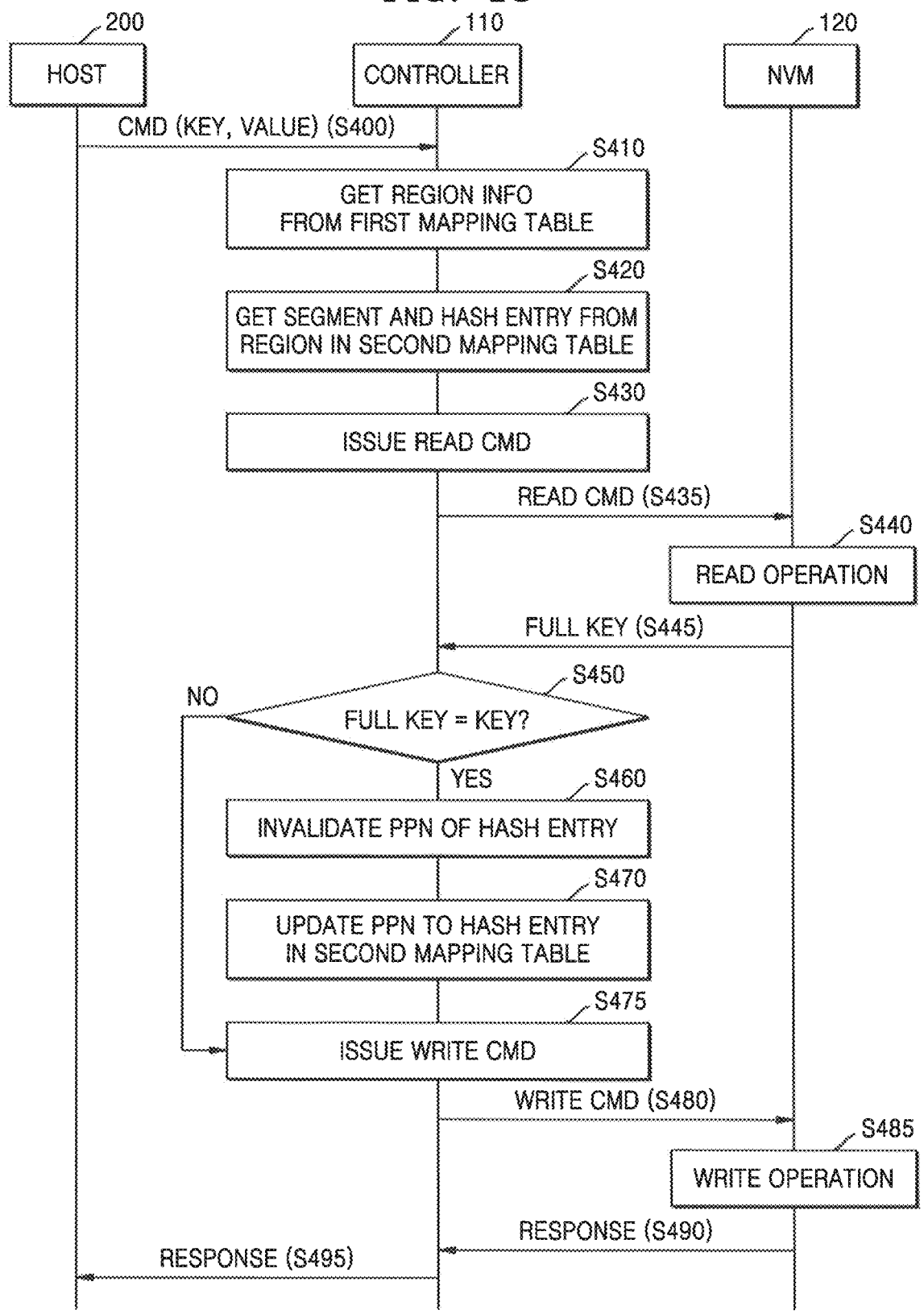
FIG. 13 is a flowchart of a write operation between a host, a controller, and a non-volatile memory, according to an exemplary embodiment of the inventive concept.
Figure 14:
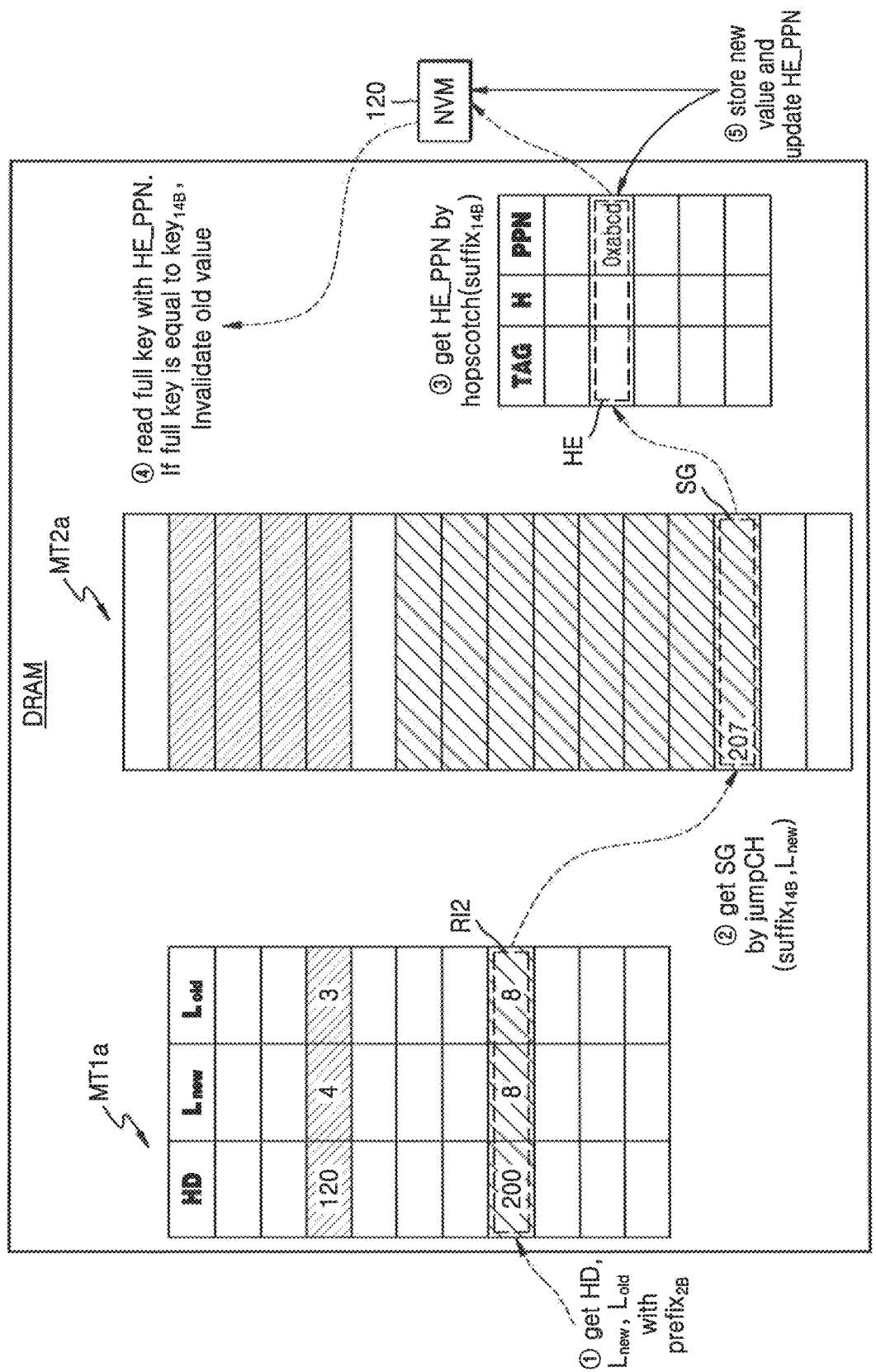
FIG. 14 shows the write operation of FIG. 13, according to an exemplary embodiment of the inventive concept.

FIG. 13 is a flowchart of a method of performing a write operation between the host 200, the controller 110, and the NVM 120 according to an exemplary embodiment of the inventive concept. FIG. 14 shows the write operation of FIG. 13, according to an exemplary embodiment of the inventive concept. The write operation according to the present embodiment may correspond to the method of FIG. 8 and will now be described with reference to FIGS. 1, 13, and 14.

In operation S400, the host 200 may transmit a command including a key and a value, for example, a put command, to the controller 110. In operation S410, the controller 110 may obtain region information from a first mapping table MT1a based on a prefix of the key. For example, when a region corresponding to a prefix $prefix_{2B}$ of the key is a second region RG2 in the first mapping table MT1a, the controller 110 may obtain second region information RI2 of the second region RG2. In this case, a size of the second region RG2 may be constant. According to the second region information RI2, a head HD of the second region RG2 may be "200," and each of a first length $L_{old}$ and a second length $L_{new}$ of the second region RG2 may be "8."

In operation S420, the controller 110 may obtain a segment SG and a hash entry HE from a region of a second mapping table MT2a based on a suffix of the key. For example, the hashing module HS of the controller 110 may perform a first hash operation on a suffix $suffix_{14B}$ of the key and a second length $L_{new}$ to obtain the segment SG. For example, as a result of the first hash operation, an index of the segment SG may be "207." Thereafter, the hashing module HS may perform a second hash operation on the suffix $suffix_{14B}$ of the key and obtain a hash entry HE in the segment SG of the second mapping table MT2a. The hash entry HE may store a physical address HE_PPN corresponding to the key.

In operation S430, the controller 110 may issue a read command based on the physical address HE_PPN. In operation S435, the controller 110 may transmit the read command to the NVM 120. In operation S440, the NVM 120 may perform a read operation and read a full key. For example, the NVM 120 may read the full key stored in the physical address HE_PPN. In FIG. 14, operation S440 may be referenced by (4) "read full key with HE_PPN". In operation S445, the NVM 120 may transmit the read full key to the controller 110. In operation S450, the controller 110 may determine if the full key is equal to an input key. If the full key is determined as equal to the input key, operation S460 may be performed. Otherwise, operation S475 may be performed.

In operation S460, the controller 110 may invalidate a physical address of the hash entry HE. In an exemplary embodiment of the inventive concept, the controller 110 may invalidate the old value. In FIG. 14, operation S460 may be referenced by (4) "If full key is equal to $key_{14B}$, Invalidate old value". In operation S470, the controller 110 may update a physical address to the hash entry HE of the second mapping table MT2a. In FIG. 14, operation S470 may be referenced by (5) "store new value and update HE_PPN". In operation S475, the controller 110 may issue a write command. In operation S480, the controller 110 may transmit a write command to the NVM 120. In operation S485, the NVM 120 may perform a write operation. In this case, the NVM 120 may write a new value to the physical address. In operation S490, the NVM 120 may transmit a response message indicating write completion to the controller 110. In operation S495, the controller 110 may transmit the response message indicating the write completion to the host 200.

Figure 15:
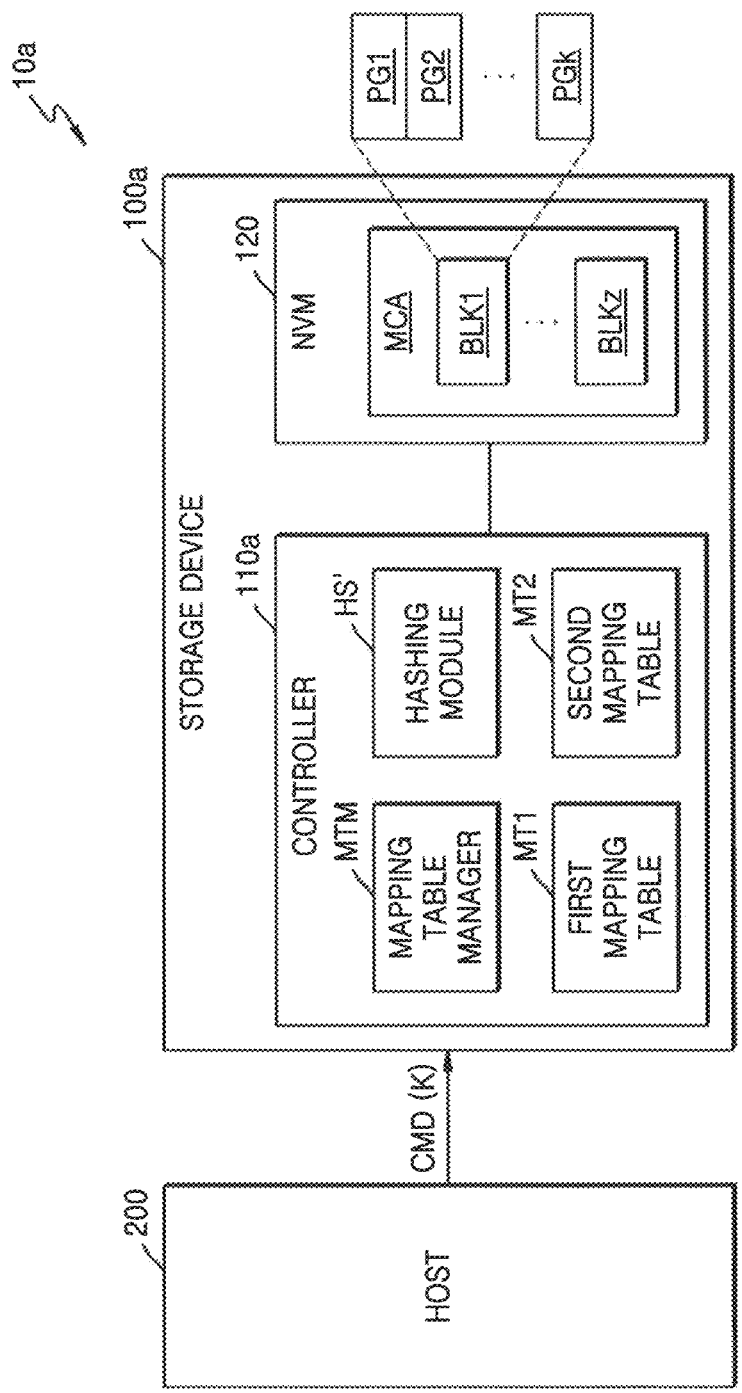
FIG. 15 is a block diagram of a modified example of a storage system according to an exemplary embodiment of the inventive concept.

FIG. 15 is a block diagram of a modified example 10a of a storage system according to an exemplary embodiment of the inventive concept.

Referring to FIG. 15, a storage device 100a may include a controller 110a and an NVM 120, and the controller 110a may include first and second mapping tables MT1 and MT2, a hashing module HS', and a mapping table manager MTM. Compared to the controller 110 of FIG. 1, the controller 110a may further include the mapping table manager MTM. All of the descriptions presented above with reference to FIGS. 1 to 14 may be applied to the present embodiment. Hereinafter, the mapping table manager MTM will mainly be described.

The mapping table manager MTM may dynamically change a region assigned to a specific prefix, based on a percentage taken by a corresponding prefix of keys that are transmitted and received between a host 200 and the storage device 100a in a runtime. When a size of the region corresponding to the prefix is fixed and input and output operations are focused on the specific prefix in an actual runtime, it may not be possible to store a new hash entry in the region assigned to the corresponding prefix.

In an exemplary embodiment of the inventive concept, the mapping table manager MTM may increase a size of a region assigned to a first prefix in the second mapping table MT2 when a percentage taken by the first prefix of the keys that are transmitted and received between the host 200 and the storage device 100a increases. In an exemplary embodiment of the inventive concept, the mapping table manager MTM may reduce the size of the region assigned to the first prefix in the second mapping table MT2 when the percentage taken by the first prefix of the keys that are transmitted and received between the host 200 and the storage device 100a is reduced. Furthermore, the mapping table manager MTM may modify region information stored in the first mapping table MT1 based on a changed size of the region. Additionally, when the percentage taken by the first prefix of the keys that are transmitted and received between the host 200 and the storage device 100a is changed within a predetermined range, the mapping table manager MTM may not change the size of the region assigned to the first prefix in the second mapping table MT2.

As described above, the mapping table manager MTM may dynamically change a size of each region according to an input/output (I/O) pattern of the host 200. Thus, rehashing may occur. For example, it may be assumed that a physical address corresponding to a key A is stored in a hash entry C included in a region B (e.g., hash (A)=C). In this case, when a size of the region B is changed, hash (A) may be changed into a value other than C. In other words, when the size of the region B is dynamically changed, all hash entries stored in the region B may be relocated based on changed hash results (e.g., hash (A)).

According to the present embodiment, the hashing module HS' may use a consistent hash operation to reduce a rehashing overhead. Here, the consistent hash operation may be a hash algorithm by which the quantity of rehashed keys may be maintained to be K/N when the number of segments included in a region is increased or reduced. Here, K may be the number of all the hash entries, and N may be the current number of segments. For example, it may be assumed that a first region includes N segments, and each of the segments includes R hash entries. In this case, when a segment is added to increase a size of the first region, a total of R*N hash entries may be relocated. In contrast, when the consistent hash operation is applied, the quantity of rehashed hash entries may be reduced to R(=R*N/N). Hereinafter, the consistent hash operation will be described with reference to FIGS. 16A to 16C.

Figure 16A:
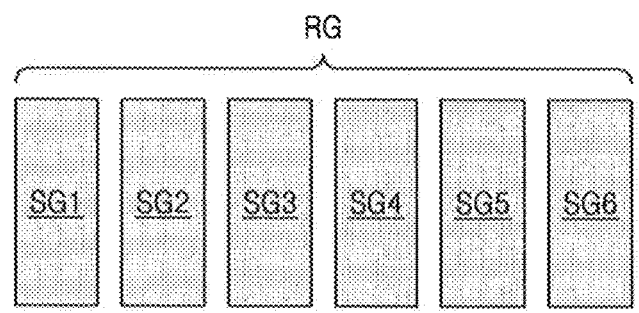
FIGS. 16A, 16B and 16C show a rehash operation on a region, according to an exemplary embodiment of the inventive concept.
Figure 16B:
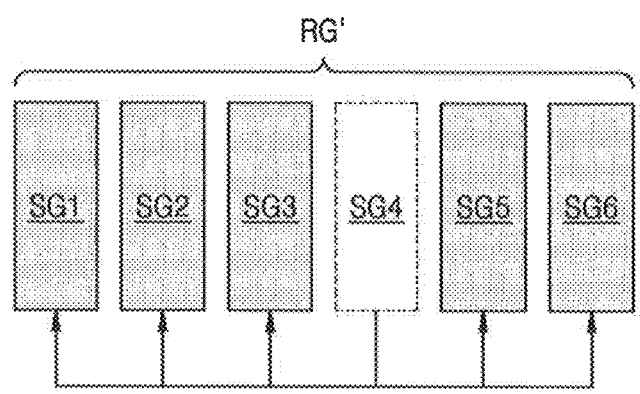
Figure 16C:
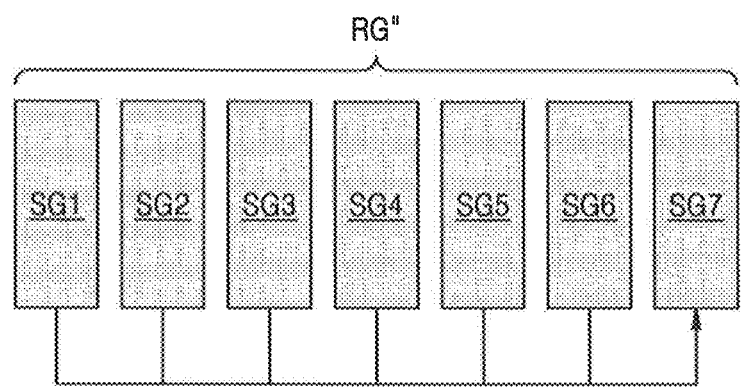

FIGS. 16A to 16C show a rehash operation on a region RG, according to an exemplary embodiment of the inventive concept.

Referring to FIGS. 16A to 16C, in an exemplary embodiment of the inventive concept, a size of the region RG may be reduced. For example, the region RG may be modified into a first modified region RG'. In an exemplary embodiment of the inventive concept, the size of the region RG may increase. For example, the region RG may be modified into a second modified region RG". The region RG may have an original size of 6. Thus, the region RG may include first, second, third, fourth, fifth and sixth segments SG1, SG2, SG3, SG4, SG5 and SG6.

A size of the first modified region RG' may be 5. For example, a fourth segment SG4 may be excluded from the region RG to generate the first modified region RG'. In this case, the hashing module HS' of the controller 110a may equally divide keys, which have been assigned to the fourth segment SG4, among the remaining segments, in other words, the first, second and third segments SG1, SG2 and SG3 and the fifth and sixth segments SG5 and SG6. For example, the hashing module HS' may assign one fifth (⅕) of the keys, which have been assigned to the fourth segment SG4, to each of the first to third segments SG1 to SG3 and the fifth and sixth segments SG5 and SG6.

A size of the second modified region RG" may be 7. For example, a seventh segment SG7 may be added to the region RG to generate the second modified region RG". In this case, the hashing module HS' may map one sixth (⅙) of the keys, which is assigned to each of the first to sixth segments SG1 to SG6, to the seventh segment SG7.

Figure 17:
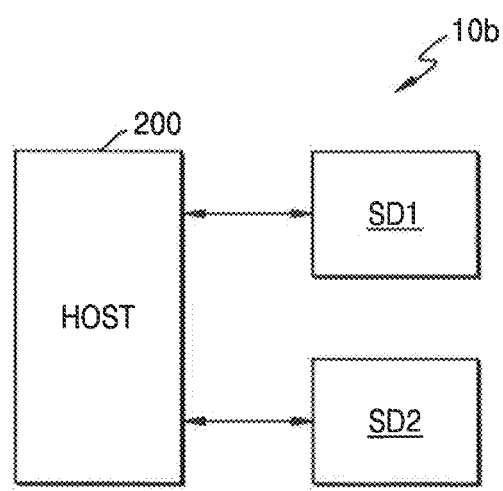
FIG. 17 is a block diagram of a modified example of a storage system according to an exemplary embodiment of the inventive concept.

FIG. 17 is a block diagram of a modified example 10b of a storage system according to an exemplary embodiment of the inventive concept.

Referring to FIG. 17, the storage system 10b may include first and second storage devices SD1 and SD2 and a host 200. For example, when the host 200 intends to transfer a predetermined range of values stored in the first storage device SD1 to the second storage device SD2, the host 200 may transmit a prefix-based iteration command to the first storage device SD1. For example, an iteration command may be a command for requesting the reading of values corresponding to all keys including a fix prefix.

The first storage device SD1 may be the storage device 100 of FIG. 1 or the storage device 100a of FIG. 15. Thus, the first storage device SD1 may store a first mapping table MT1 configured to store region information corresponding to a prefix and a second mapping table MT2 including segments for each region. The first storage device SD1 may obtain region information corresponding to a prefix included in the iteration command from the first mapping table MT1 in response to the iteration command received from the host 200. Thereafter, the first storage device SD1 may perform a hash operation based on suffixes of keys and region information, obtain physical addresses from the second mapping table, read values from the physical addresses, and transmit the read values to the host 200. Thus, the host 200 may write values of keys having a specific prefix to the second storage device SD2.

Figure 18:
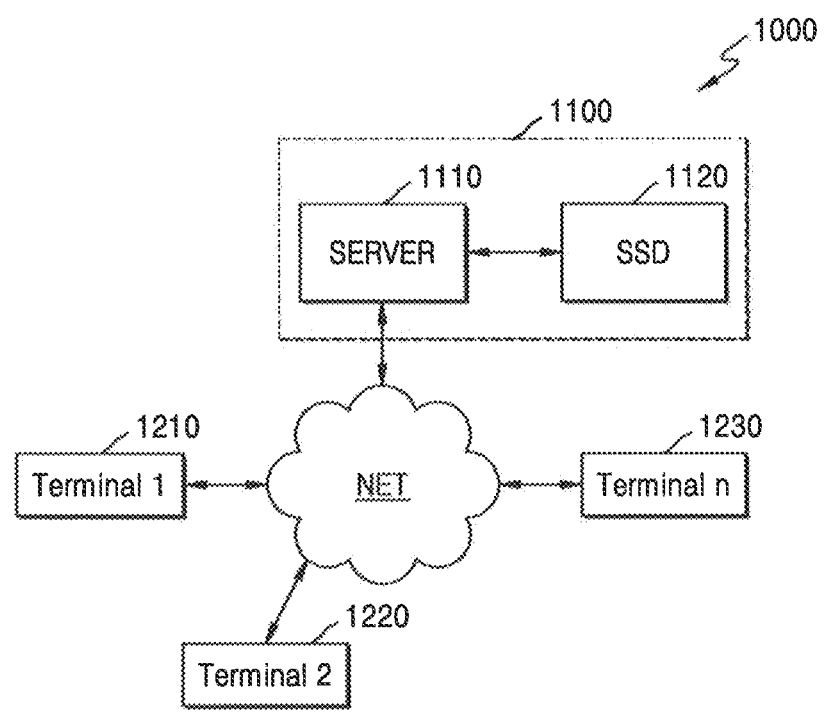
FIG. 18 shows a network system according to an exemplary embodiment of the inventive concept.

FIG. 18 shows a network system 1000 according to an exemplary embodiment of the inventive concept.

Referring to FIG. 18, the network system 1000 may include a server system 1100 and a plurality of terminals 1210, 1220 and 1230 configured to communicate with the server system 1100 through a network NET. The server system 1100 may include a server 1110 and an SSD 1120. In this case, the server 1110 may correspond to a host (e.g., 200) of the above-described embodiments, and the SSD 1120 may correspond to a storage device (e.g., 100) of the above-described embodiments. In an exemplary embodiment of the inventive concept, the SSD 1120 may be implemented using the embodiments described above with reference to FIGS. 1 to 17.

Figure 19:
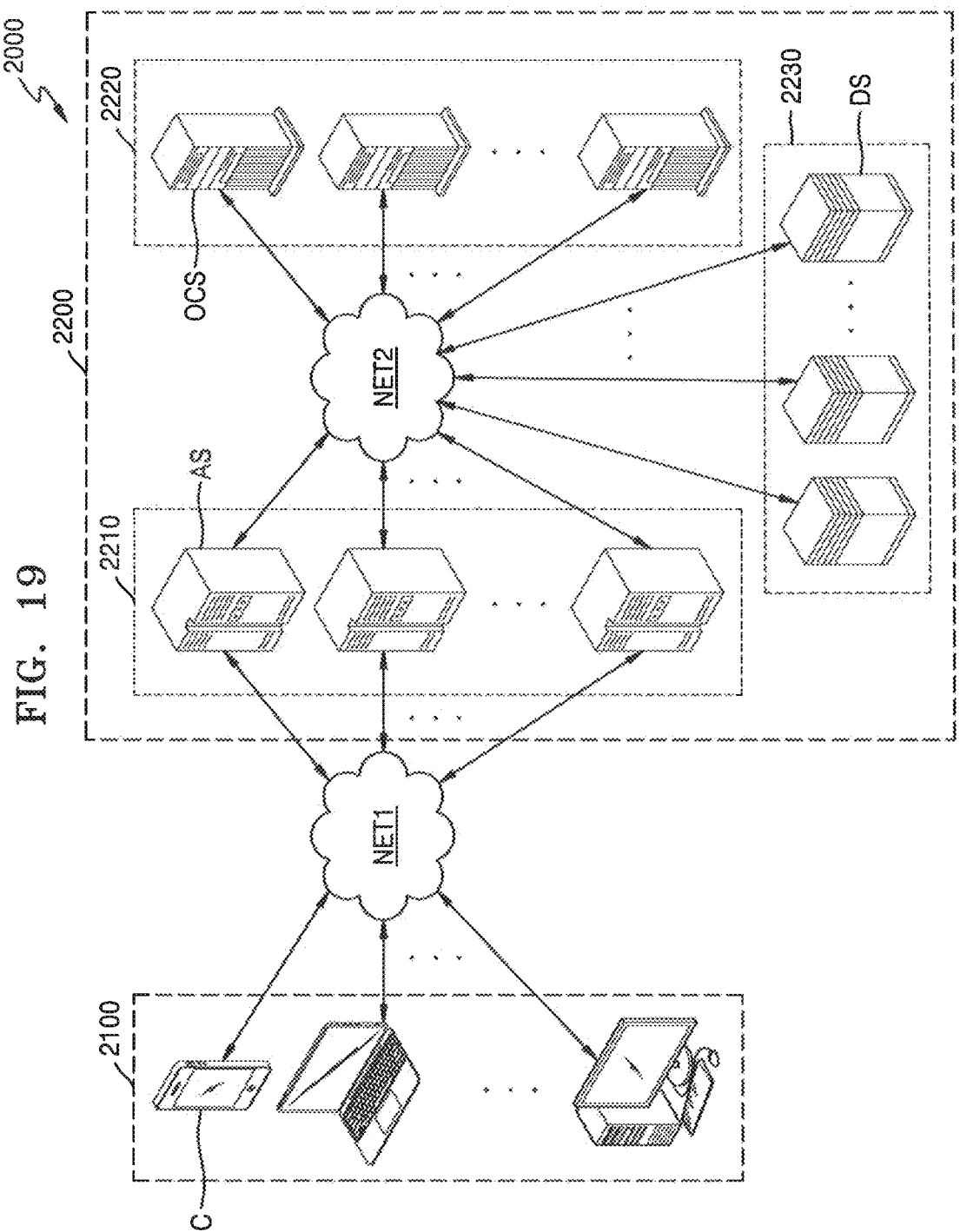
FIG. 19 shows a network according to an exemplary embodiment of the inventive concept.

FIG. 19 shows a network system 2000 according to an exemplary embodiment of the inventive concept.

Referring to FIG. 19, the network system 2000 may include a client group 2100 and a data center 2200. The client group 2100 may include client devices C configured to communicate with the data center 2200 through a first network NET1, for example, the Internet. The data center 2200 may be a facility configured to collect various pieces of data and provide services and includes an application server group 2210, a database server group 2220, and an object cache server group 2230, which may communicate with each other through a second network NET2, for example, a local area network (LAN) or an intranet.

The application server group 2210 may include application server devices AS. The application server devices AS may process requests received from the client group 2100 and access the database server group 2220 or the object cache server group 2230 upon a request from the client group 2100. The database server group 2220 may include database server devices DS configured to store data processed by the application server devices AS. The object cache server group 2230 may include object cache server devices OCS configured to temporarily store data stored in the database server devices DS or data read from the database server devices DS. Thus, the object cache server group 2230 may function as a cache between the application server devices AS and the database server devices DS. In an exemplary embodiment of the inventive concept, the object cache server devices OCS may be implemented using the embodiments described above with reference to FIGS. 1 to 17.

Figure 20:
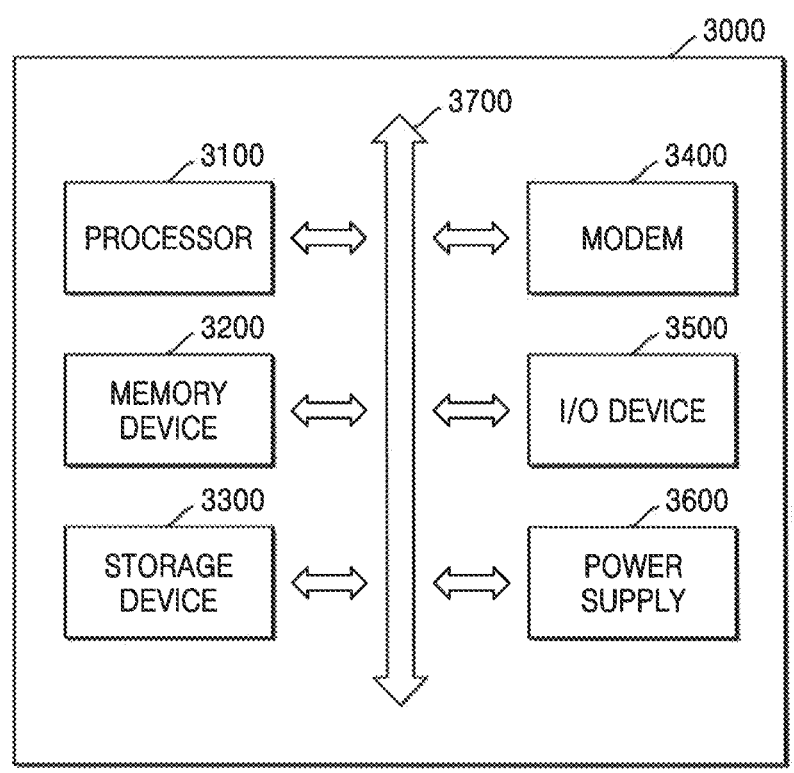
FIG. 20 shows an electronic device according to an exemplary embodiment of the inventive concept.

FIG. 20 shows an electronic device 3000 according to an exemplary embodiment of the inventive concept.

Referring to FIG. 20, the electronic device 3000 may include a processor 3100, a memory device 3200, a storage device 3300, a modem 3400, an input/output (I/O) device 3500, and a power supply 3600 that communicate with each other via a bus 3700. In an exemplary embodiment of the inventive concept, the storage device 3300 may be implemented using the embodiments described above with reference to FIGS. 1 to 17.

While the inventive concept has been particularly shown and described with reference to exemplary embodiments thereof, it will be understood by one of ordinary skill in the art that various changes in form and details may be made therein without departing from the spirit and scope of the inventive concept as defined by the following claims.

What is claimed is:
1. A memory controller, comprising:
a memory configured to store first and second mapping tables; and
a hashing module configured to receive a command including a first key from a host and retrieve a first physical address corresponding to the first key by using the first and second mapping tables, wherein the hashing module includes hardware,
wherein the first mapping table is configured to Store first region information about a first region corresponding to a partial region of the first key, the first region including, at least one segment, and
the second mapping table is configured to store a plurality of segments, wherein each segment comprises a plurality of hash entries, the plurality of segments are grouped into a plurality of regions, and each of the plurality of hash entries stores a tag corresponding to a key and a physical address corresponding to the key,
wherein when the command corresponds to an iteration command requesting reading of first to N-th values respectively corresponding to first to N-th keys, and

N is an integer equal to or more than 2, and each of the first to N-th keys includes a first prefix, the hashing module is configured to obtain the first region information corresponding to the first prefix from the first mapping table and only retrieve physical addresses corresponding to the first to N-th keys from the first region of the second mapping table, and the memory controller is configured to control a read operation on a non-volatile memory using the physical addresses.

2. The memory controller of claim , wherein the partial region of the first key corresponds to the first prefix of the first key, and the first mapping table is configured to store the first region information about the first region assigned to the first prefix.

3. The memory controller of claim 2, wherein the first region information comprises a head indicating a head index of the first region in the second mapping table, and a length indicating a size of the first region in the second mapping table.

4. The memory controller of claim 2, wherein the first region information comprises a head indicating a head index of the first region in the second mapping table, a first length indicating a previous size of the first region in the second mapping table, and a second length indicating a changed size of the first region in the second mapping table.

5. The memory controller of claim 1, wherein the hashing module is configured to perform a first hash operation on the first key and the first region information to retrieve a first segment from the second mapping table and perform a second hash operation on the first key to retrieve a first hash entry from the first segment.

6. The memory controller of claim 5, wherein the first hash operation is a consistent hash operation.

7. The memory controller of claim 5, wherein the second hash operation is a hopscotch hash operation.

8. The memory controller of claim 1, wherein when the command corresponds to a read command including the first key, the hashing module is configured to retrieve the first region information from the first mapping table based on the first prefix of the first key, and retrieve the first physical address from the first region of the second mapping table based on a suffix of the first key and the first region information.

9. The memory controller of claim 8, wherein the hashing module is configured to perform a first hash operation on the suffix of the first key and the first region information to retrieve a first segment from the first region of the second mapping table and perform a second hash operation on the suffix of the first key to retrieve a first hash entry from the first segment.

10. The memory controller of claim 9, wherein the first region information comprises a first length indicating a previous size of the first region and a second length indicating a changed size of the first region, wherein, when all hash entries included in the first segment are invalid, the hashing module is configured to perform the first hash operation on the suffix of the first key and the first length to retrieve a second segment from the first region of the second mapping table and perform the second hash operation on the suffix of the first key to retrieve a second hash entry from the second segment.

11. The memory controller of claim 10, wherein, when a second physical address included in the second hash entry is valid, the hashing module is configured to copy the second hash entry to the first hash entry and invalidate the second hash entry.

12. The memory controller of claim 1, wherein when the command corresponds to a write command including the first key and a first value corresponding to the first key, the hashing module is configured to retrieve the first region information front the first mapping table based on the first prefix of the first key and retrieve the first physical address from the first region of the second mapping table based on a suffix of the first key and the first region information, and the memory controller is configured to control a write operation on the non-volatile memory using the first physical address.

13. The memory controller of claim 12, wherein, when a full key stored in the first physical address in the non-volatile memory is equal to the first key, the hashing module is configured to invalidate the first physical address, write the first value to a new physical address in the non-volatile memory, and update the new physical address to the second mapping table.

14. A memory controller, comprising:

a memory configured to store first and second mapping tables; and a hashing module configured to receive a command including a first key from a host and retrieve a first physical address corresponding to the first key by using the first and second mapping tables, wherein the hashing module includes hardware, wherein the first mapping table is configured to store first region information about a first region corresponding to a prefix of the first key, the first region having a variable size, the second mapping table is configured to store at least one segment corresponding to the first region, the at least one segment including a plurality of hash entries, and a size of the first region in the second mapping table varies based on prefixes of keys that are transmitted and received between the host and the memory controller, wherein the hashing module is configured to perform a first hash operation on a suffix of the first key and the first region information to retrieve a first segment from the second mapping table and perform a second hash operation on the suffix of the first key to retrieve a first hash entry from the first segment, wherein the command corresponds to a read command including the first key, the hashing module is configured to retrieve the first region information from the first mapping table based on the prefix of the first key, and retrieve the first physical address from the first region of the second mapping table based on the suffix of the first key and the first region information, and the memory controller is configured to control a read operation on a non-volatile memory using the first physical address, wherein the first region information comprises a first length indicating a previous size of the first region and a second length indicating a changed size of the first region, wherein, when all hash entries included in the first segment are invalid, the hashing module is configured to perform the first hash operation on the suffix of the first key and the first length to retrieve a second segment from the first region of the second mapping table and perform the second hash operation on the suffix of the first key to retrieve a second hash entry from the second segment.

15. The memory controller of claim 14, further comprising a mapping table manager configured to increase the size of the first region assigned to a certain prefix in the second mapping table when a percentage of the keys that are transmitted and received between the host and the memory controller increases, the mapping table manager being configured to reduce the size of the first region in the second mapping table when the percentage of the keys is reduced,
 wherein, when the size of the first region is changed, the hashing module is further configured to perform a rehashing operation on the first region having the changed size using a consistent hash operation.

16. A memory controller, comprising:
a memory configured to store first and second mapping tables; and
a hashing module configured to receive a command including a first key from a host and retrieve a first physical address corresponding to the first key by using the first and second mapping tables, wherein the hashing module includes hardware,
wherein the first mapping table is configured to store first region information about a first region corresponding to a prefix of the first key, the first region having a variable size,
the second mapping table is configured to store at least one segment corresponding to the first region, the at least one segment including a plurality of hash entries, and
a size of the first region in the second mapping table varies based on prefixes of keys that are transmitted and received between the host and the memory controller,
wherein the hashing module is configured to perform a first bash operation on a suffix of the first key and the first region information to retrieve a first segment from the second mapping table and perform a second hash operation on the suffix of the first key to retrieve a first hash entry from the first segment,
wherein the command corresponds to an iteration command requesting reading of first to N-th values respectively corresponding to first to N-th keys, wherein N is an integer equal to or more than 2, and each of the first to N-th keys includes the prefix,
wherein the hashing module is configured to obtain the first region information corresponding to the prefix from the first mapping table and only retrieve physical addresses corresponding to the first to N-th keys from the first region of the second mapping table, and
the memory controller is configured to control a read operation on a non-volatile memory using the physical addresses.

* * * * *